(12) United States Patent  (10) Patent No.: US 6,364,341 B1
Perkins et al.  (45) Date of Patent: Apr. 2, 2002

(54) AIR BAG AND MODULE

(75) Inventors: Derek Perkins, Farmington Hills; Thomas A. Ennis; Simon X. He, both of Troy, all of MI (US)

(73) Assignee: Breed Automotive Technology, Inc., Lakeland, FL (US)

(*) Notice: Subject to any disclaimer, the term of this patent is extended or adjusted under 35 U.S.C. 154(b) by 0 days.

(21) Appl. No.: 09/452,083

(22) Filed: Nov. 30, 1999

(51) Int. Cl.⁷ .............................................. B60R 21/16
(52) U.S. Cl. .................................... 280/728.2; 280/732
(58) Field of Search ...................... 280/728.2, 728.1, 280/728.3, 732, 743, 743.1

(56) References Cited

U.S. PATENT DOCUMENTS

| | | | |
|---|---|---|---|
| 4,332,398 A | * 6/1982 | Smith | 280/732 |
| 4,944,527 A | * 7/1990 | Bishop et al. | 280/741 |
| 5,022,675 A | * 6/1991 | Zekenak, Jr. et al. | 280/743 |
| 5,360,231 A | * 11/1994 | Adams | 280/728 A |
| 5,362,101 A | * 11/1994 | Sugiura et al. | 280/743 |
| 5,505,489 A | * 4/1996 | Bollaert et al. | 280/743.1 |
| 5,676,392 A | 10/1997 | Lunt et al. | |
| 5,788,269 A | * 8/1998 | Jakovski et al. | 280/728.2 |
| 5,913,536 A | * 6/1999 | Brown | 280/730.2 |
| 5,918,898 A | * 7/1999 | Wallner et al. | 280/728.2 |

FOREIGN PATENT DOCUMENTS

| | | |
|---|---|---|
| DE | 42 33 751 A1 | 4/1994 |
| JP | 05185889 | 7/1993 |
| JP | 06127321 | 5/1994 |

* cited by examiner

*Primary Examiner*—Paul N. Dickson
*Assistant Examiner*—Deanna Draper
(74) *Attorney, Agent, or Firm*—Markell Seitzman

(57) ABSTRACT

An air bag (22) having: an inflatable cushion portion (30) and a neck portion (32) in communication therewith, the neck portion defines a receiving opening to receive inflation gas, received from an inflator, to inflate the cushion portion (30). The air bag is made from flexible material and a retainer member(s) (70a,b; 100) and is preferably sewn to at least a part of the neck portion to reinforce the neck portion and to reduce the flexibility of the neck portion. The invention further includes an air bag module that utilizes the above air bag. The module includes a housing and an inflator. The housing has grooves (50a,b) for receiving a first edge of a retainer member and further includes a holding member (41a,b) formed as part of a wall of the housing (24) and which is bent or crimped over to hold a second edge of the retainer member.

8 Claims, 27 Drawing Sheets

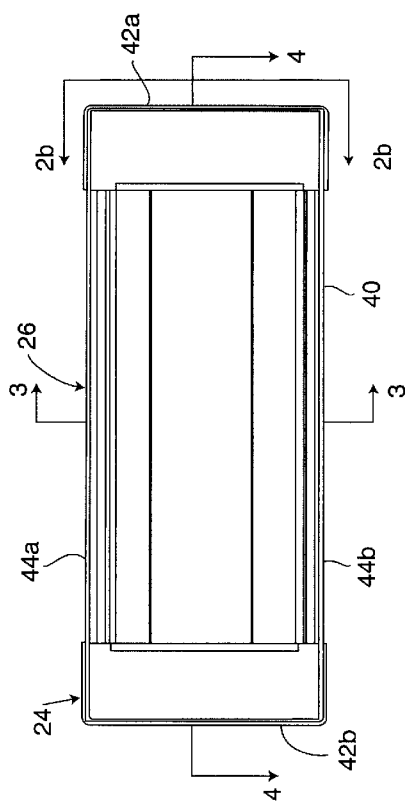
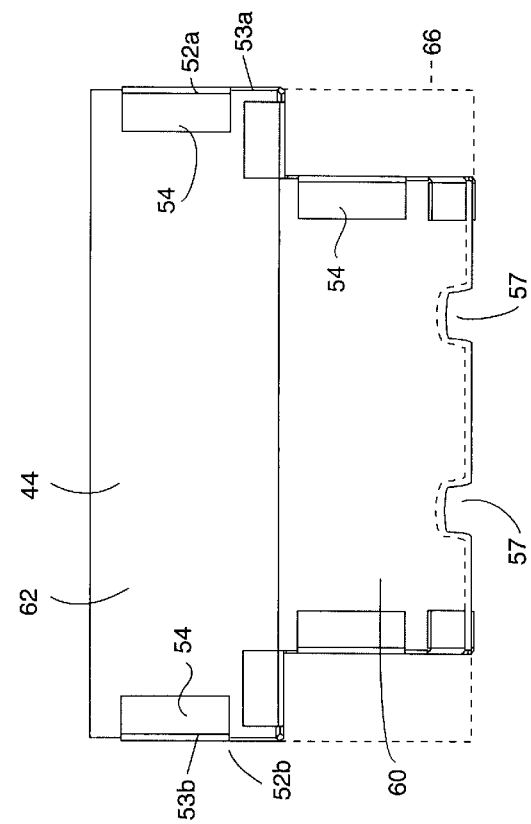
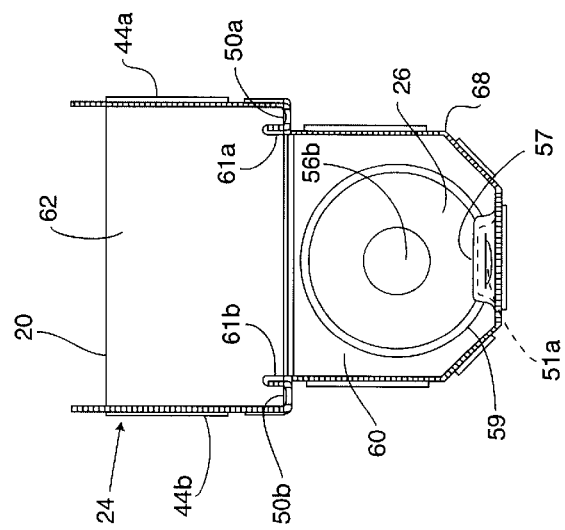

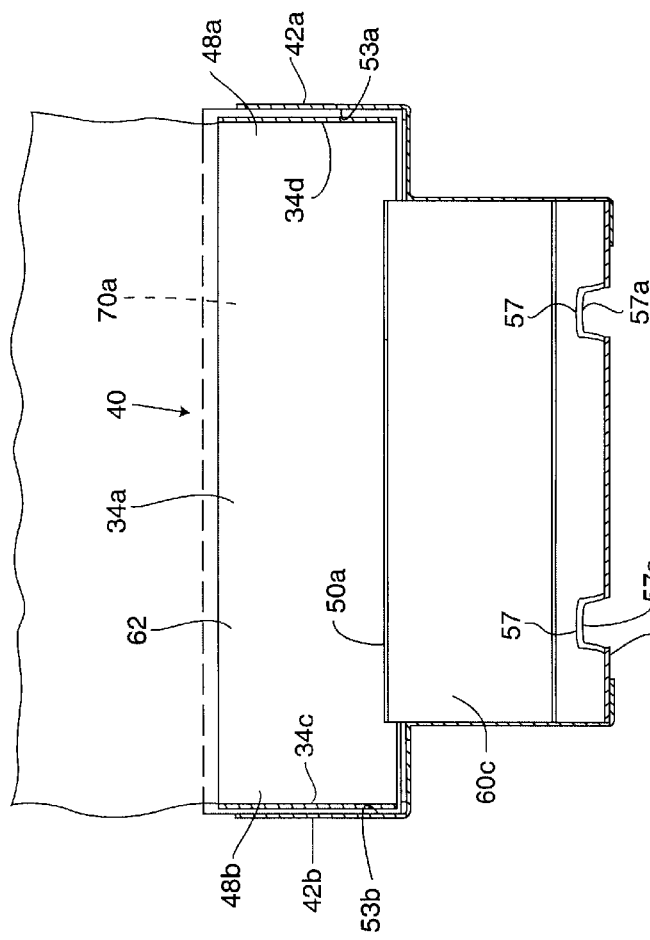
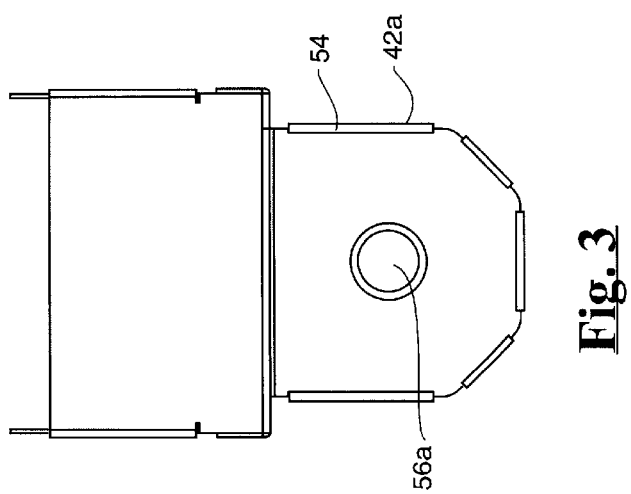

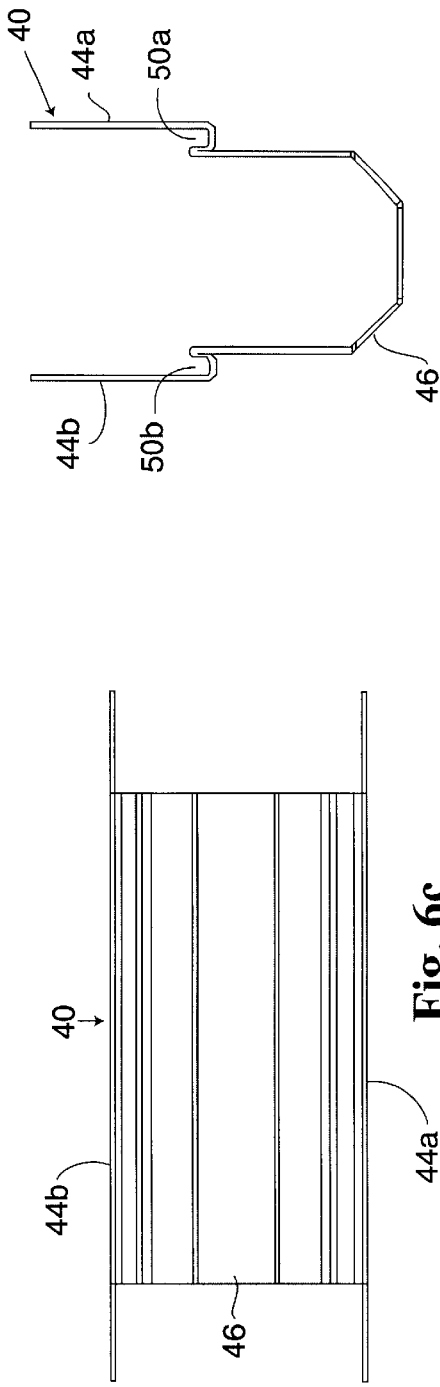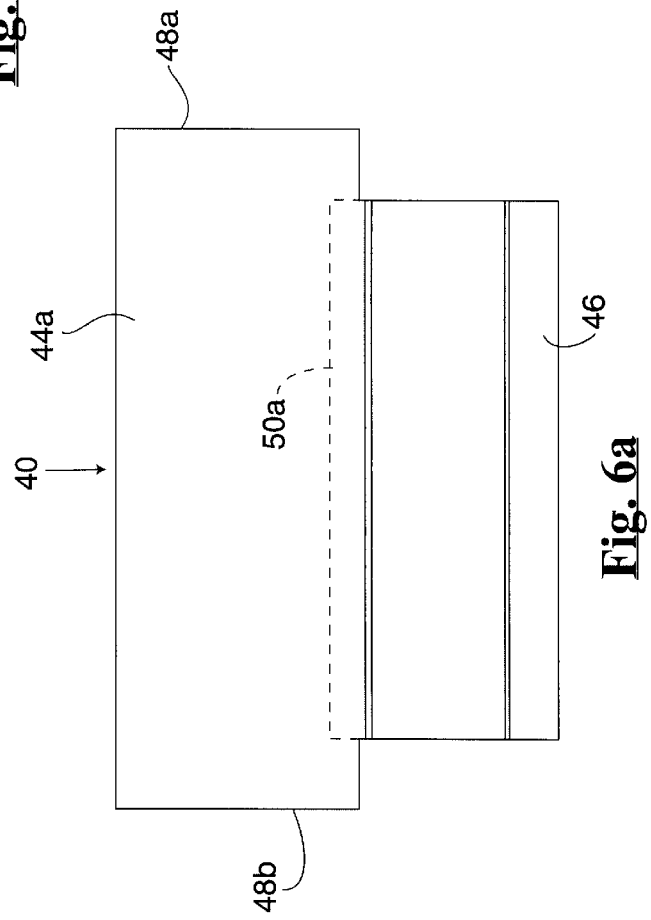

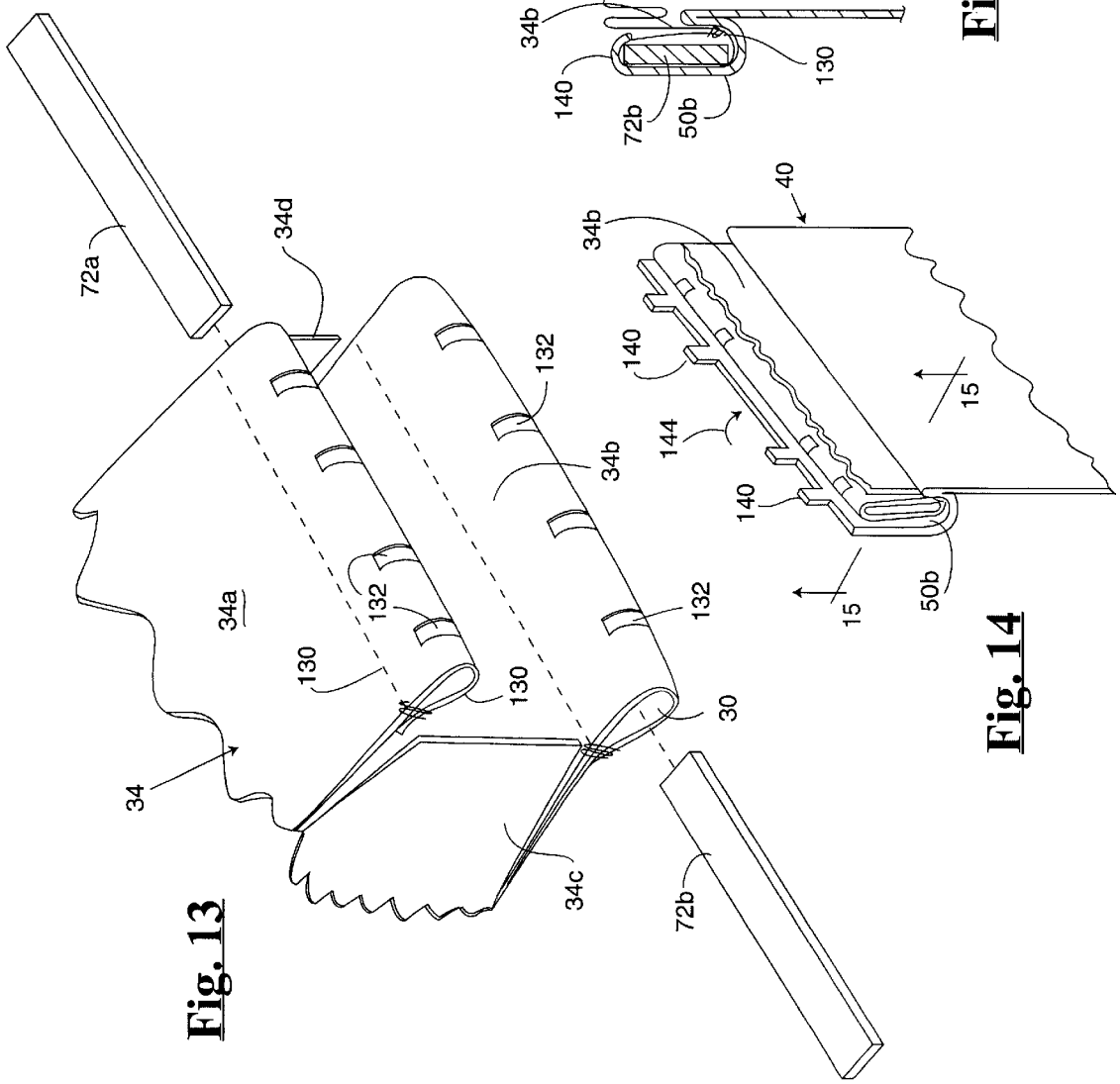
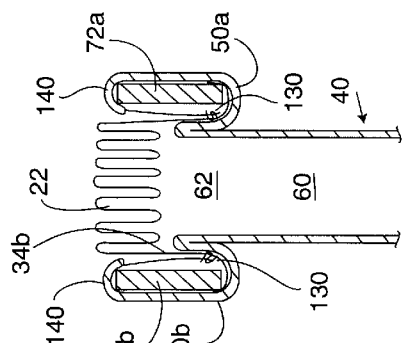
Fig. 15
Fig. 14
Fig. 13

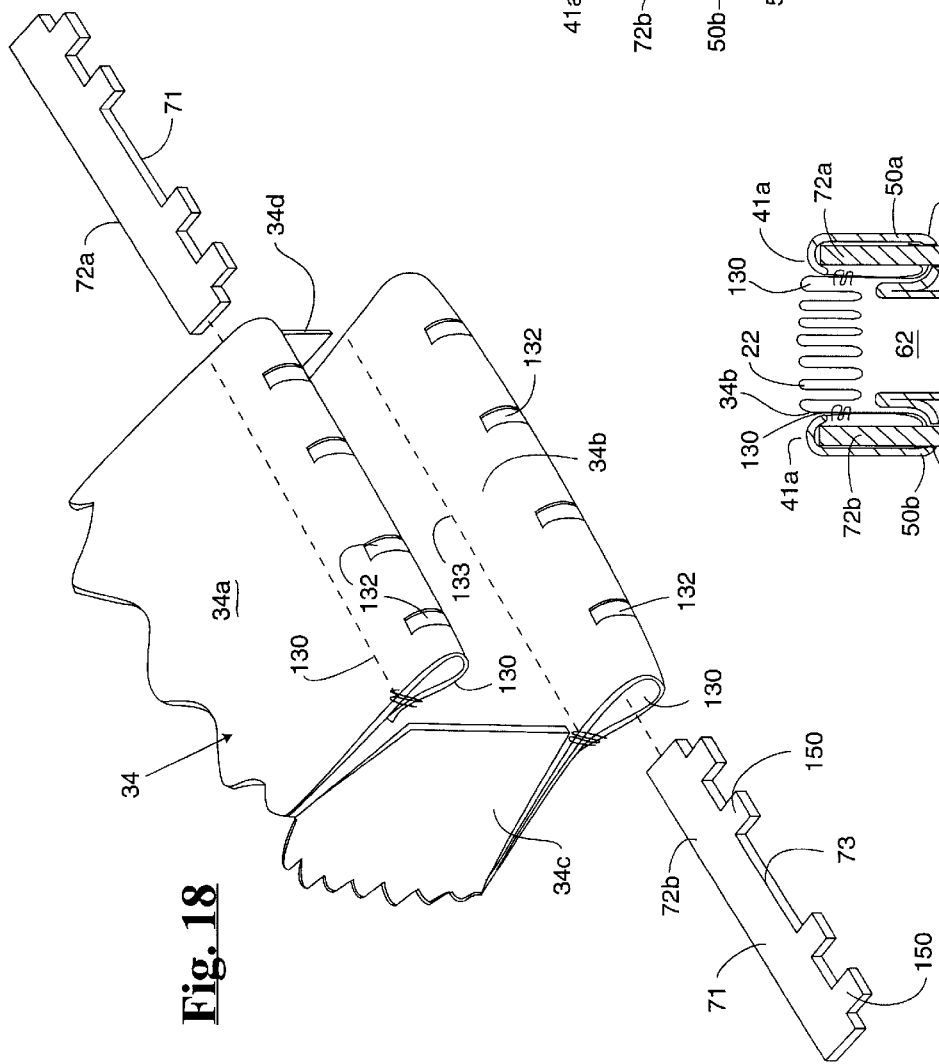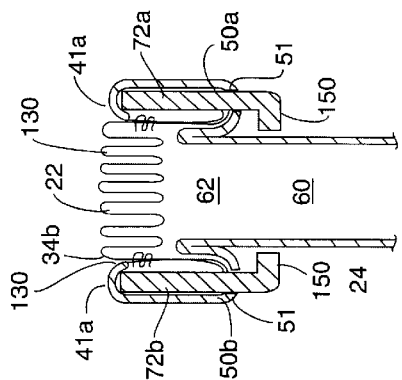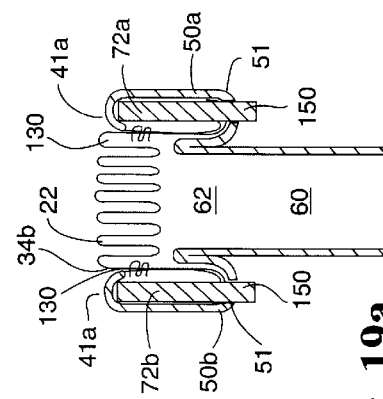

AIR BAG AND MODULE

BACKGROUND AND SUMMARY OF THE INVENTION

The present invention generally relates to air bags and air bag modules. More specifically, the invention relates to an air bag that includes a flexible neck attached to and reinforced by one or more plastic panels or members to facilitate attachment to a housing.

It is an object of the present invention to provide an improved air bag with a reinforced neck.

It is a further object of the present invention to provide an improved air bag module that includes a novel method of attaching an air bag to an associated housing or to a cover without separate fasteners.

Accordingly the invention comprises: an air bag which includes: an inflatable cushion portion and a neck portion in communication therewith, the neck portion defines a receiving opening or passage through which inflation gas is received, from an inflator, to inflate the cushion portion. The air bag is made from flexible material and a retaining member(s) is preferably sewn or otherwise secured to at least a part of the neck portion thereby reinforcing a portion thereof, to facilitate attachment of the air bag to a housing. The housing, air bag and inflator are part of a module. The housing includes a receiving feature such as one more grooves for receiving a first or lower edge of a particular retaining member and further includes a holding member formed by bending or crimping over a portion of a housing wall to hold a second or top edge of the retaining member. The invention is applicable to most types of air bag systems including, but not limited to, driver-side, passenger-side and side impact systems. In one embodiment the retaining members are formed by a portion of the deployment cover.

Many other objects and purposes of the invention will be clear from the following detailed description of the drawings.

BRIEF DESCRIPTION OF THE DRAWINGS

In the drawings:

FIGS. 2a–2c respectively illustrate a top, end, and side plan view of a housing.

FIG. 3 is a cross-sectional view through section line 3—3 of FIG. 2a.

FIG. 4 is a cross-sectional view through section lines 4—4 of FIG. 2a and also shows the orientation of a retaining member and neck side.

FIGS. 6a–6c illustrate a side, an end and a top view of a center housing member.

FIGS. 13 through 15 show another embodiment of the invention.

FIGS. 18 and 19 show further variations of the present invention.

FIG. 19a shows a variation of the embodiment of FIG. 19.

DETAILED DESCRIPTION OF THE DRAWINGS

Figure 1:
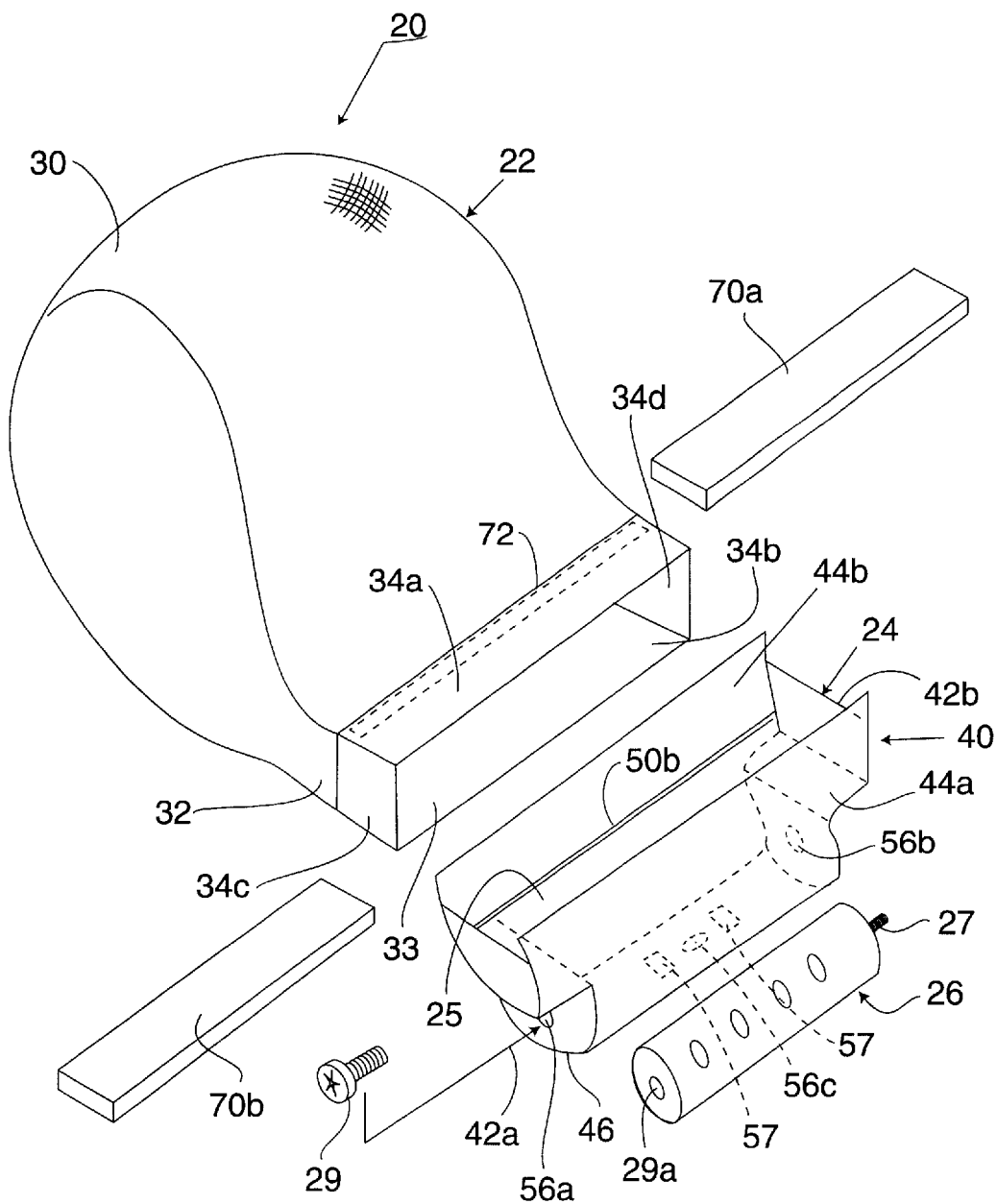
FIG. 1 is an assembly view illustrating the major components of the present invention.

Reference is made to FIG. 1, which illustrates the major components of an air bag module 20 incorporating aspects of the present invention. These major components of the module 20 comprise an air bag 22, a housing 24 and inflator 26. The module 20 may include an optional cover (not shown) that is opened by the air bag 22 as it inflates. The cover may be secured to the housing or secured to or incorporated into another vehicular component such as an instrument panel with the housing and air bag spaced below the cover.

Figure 5:
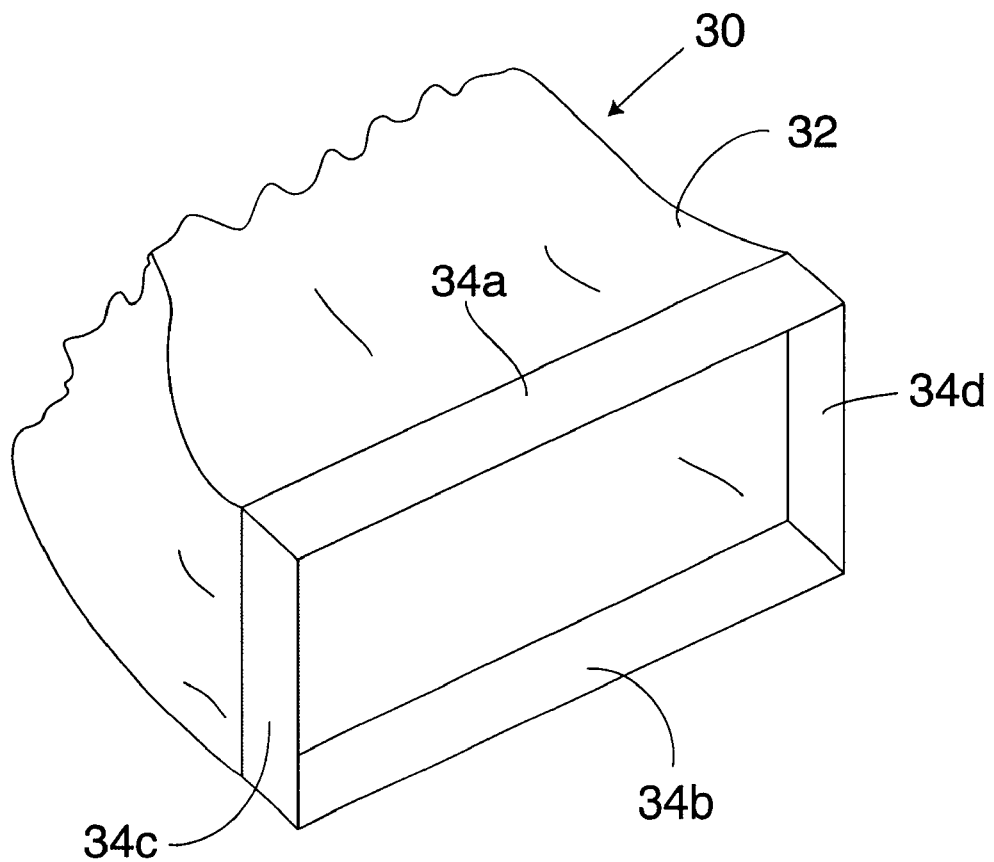
FIG. 5 illustrates an alternate embodiment of an air bag.

The air bag is made, for example, from a flexible film or woven fabric and includes an inflatable cushion portion (or cushion) 30 with a neck portion (or neck) 32 which is an extension of the cushion 30. The neck 32 defines an opening 33 through which inflation gas, generated by the inflator, enters the cushion. The shape of the neck will generally be dictated by the shape of the inflator or of the housing. As illustrated in FIG. 1, the neck is generally rectangularly shaped having sides 34a–34d that extend outwardly from the cushion about the opening 33. The various sides 34a–34d may be segmented into flaps (as shown in FIG. 1) or joined together as illustrated in FIG. 5. In the first embodiment of the invention the neck 32 is sized to fit within a generally rectangularly shaped open mouth 25 of the housing 24. The neck 32 can be shaped differently to conform to different housing shapes such as a trapezoid, square, oval or circular. Additionally, the sides of the neck may be of different lengths. The housing and retainers 70a and 70b (mentioned below), in such cases, are designed to mate.

In one embodiment, the housing 24 includes a central body portion or body part 40 with ends or caps 42a and 42b. The end caps may be separate pieces secured to the central body or body part 40 or the end caps can be formed integrally with other portions of the housing. Further details of the housing 24 are shown in FIGS. 2a–b, 3 and 4.

Additionally, FIGS. 6a–6c illustrate various views of only the central body 40 of the housing 24. As shown in FIG. 1, the central body 40 includes sides 44a and 44b and a bottom 46 that may be integrally formed with the sides 44a and 44b. As can be appreciated from the various figures, the side profile of the central body 40 can be T-shaped. The central body is open at its ends 48a and 48b as shown in FIGS. 6a–6c. The end caps close the open ends of the central body as shown in, for example, FIG. 4. The central body, as well as the entire housing, may be made of metal or plastic. The housing can be constructed of sheet metal, cast (metal or plastic) or can be extruded (metal or plastic). The end caps and the central body need not be made from the same material. As can be appreciated, if the housing is made of metal or plastic it can be cast or molded as an integral whole.

In one embodiment, the central body 40 is made from formed sheet metal that is shaped into the sides 44a and 44b and bottom 46. Each side is bent to form a respective internal groove 50a and 50b (see FIG. 2b) which is typically as long as bottom 46. The bottom 46 supports the cylindrically shaped inflator 26. As an example, the bottom (in cross-section) can be hexagonal shaped (see FIG. 2a) or semicircular in shape (see FIG. 1). The end caps 42a and 42b shown in FIGS. 2a–2c and 3 are formed using stamped sheet metal parts. Each end cap has a plurality of tabs such as 54 that are secured, such as by welding, riveting or other equivalent attachment process, to the center body part 40 forming the housing 26 of FIGS. 1 and 4. The bottom of the housing may also include one or more integrally formed stand-offs 57, which if needed, elevate the inflator from the bottom of the housing. With regard to sheet metal construction, the end caps can alternatively be formed integrally as part of the sheet metal forming the central body and moved or bent into place. As can be seen from FIG. 1 and other figures, the end caps include openings 56a and 56b. These openings 56a,b are used to provide a through passage for the electrical connectors or wires for the initiator or squib of a single or multi-stage inflator. As an example, the wires can be connected to squibs located at one or both ends of the inflator. In this case, the inflator is secured by one or more peripheral clamps or straps 59 as shown in FIG. 2b. The clamp 59 extends about the body of the inflator and about the bottom of the housing. If desired, the clamps or straps 59 may be positioned within the underside 57a of each stand-off 57, which is formed as a groove.

An additional passage or opening 56c can be formed in the bottom through which the inflator, squib wires and connectors can be passed. The openings in each end cap can also be used to provide a means for securing the inflator 26 to the housing 24. In this case the straps 59 are not used. The inflator 26 may be secured to the housing 24 in a number of ways. For example, the inflator can be attached to the housing using any combination of threaded stud or boss 27, on one or both ends, that is secured by a nut (not shown), or a threaded bolt 29 received within a threaded hole 29a on an end of the inflator. If the inflator is secured directly to the end caps obscuring the openings therein, the squib wires can be fed through the bottom opening 56c.

The bottom and sides of the housing 24 define an inflator-receiving chamber or cavity 60 and the sides of the housing define an air bag receiving chamber or cavity 62. The inflator cavity 60 is sized to accommodate the inflator while providing access to the associated electrical connectors. The air bag cavity 62 is sufficiently large to receive a folded air bag of a predetermined size and volume. In the illustrated embodiment, chamber 60 is essentially located below the grooves 50a and 50b and the chamber 62 is situated there-above. In the present embodiment, the inflator 26 is placed within the inflator-receiving cavity 60 prior to installation of the air bag 22 into the housing 24. As mentioned above, the inflator 26 may be secured to the housing using any of a number of known techniques. The inflator can also be inserted into the housing after the air bag is attached. If for example, at least one of the openings 56a and 56b is sufficiently large, the inflator 26 can be inserted in the housing through the larger sized opening 56a or 56b and then fastened to the housing 24.

Reference is again briefly made to the various cross-sectional views of the housing as shown in, for example, FIGS. 2a–2c and 6a–6c. As can be seen, the center body 40 is generally T-shaped or stepped such that the air bag-receiving chamber 62 is larger than the inflator-receiving chamber 60. As can be seen from FIG. 2c, the various end caps 42a and 42b are stepped to accommodate the T-shape and enclose the open ends 48a, 48b of the center body. The T-shape of the housing is not a requirement of the invention. It should be appreciated that the housing 24 can also be constructed in a generally rectangular shape, in its side view, as shown by the dotted lines 66. In this case the chambers 60 and 62 would generally have the same width and length and each end cap would be flat.

Reference is made to FIGS. 1, 4, 6b and 7, which are helpful in explaining how the air bag 22 is secured to the housing 24. A retaining member such as a thin, rectangular plastic bar 70a (or 70b) is first secured to the one side of the neck such as the side (or flap) 34a. The bar 70a essentially reinforces the side 34a and provides the strength and rigidity desired to facilitate insertion of the side of the air bag in the housing 24. The use of a thin plastic bar advantageously permits the bar to be secured to the side or flaps 34a,b by sewing. The bar can be made from plastic (including thermoplastic elastomers (TPE), thermoplastic olefins (TPO) or thermoplastic urethanes (TPU)). Additionally, the plastic bar can be sonic (or RF) welded to a corresponding side of the air bag. The bar can be made, for example, from metal such as aluminum or steel. The retainer 70a, 70b can be riveted to the neck side (see FIG. 7b) or stapled thereto (see FIG. 7d).

Figure 7:
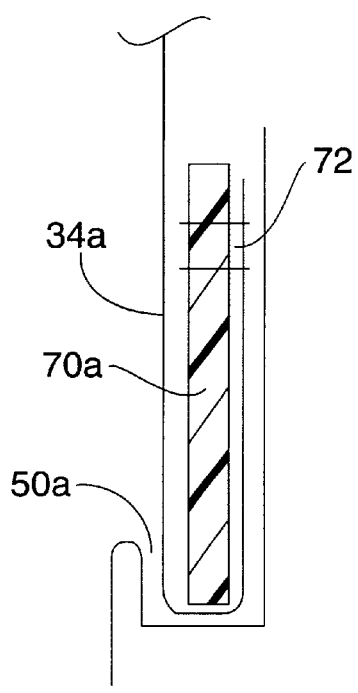
FIG. 7 is a partial cross-sectional view showing a portion of the neck of the air bag attached to a retaining member.
Figure 7A:
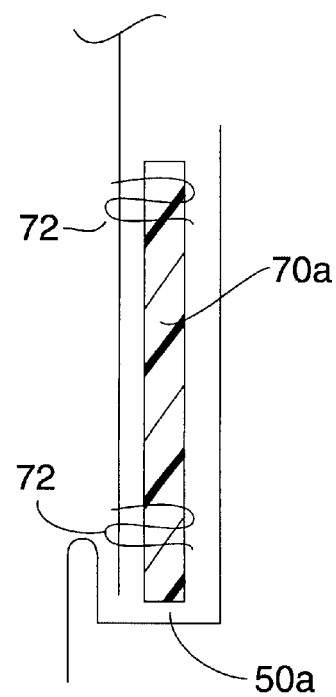
FIG. 7a shows an alternate mode of attaching the air bag to the retaining member.
Figure 7B:
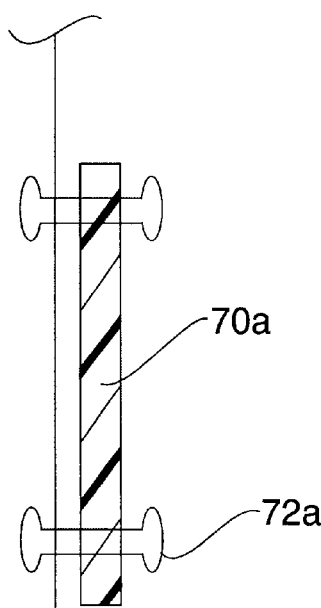
FIG. 7b shows an alternate mode of attaching the air bag to the retaining member using rivets.
Figure 7C:
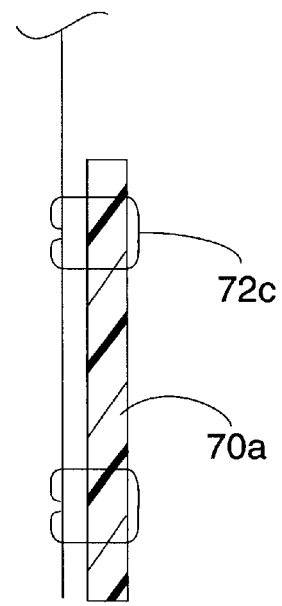
FIG. 7c shows an alternate mode of attaching the air bag to the retaining member using staples.

The area of bar 70a is generally chosen to be about the same size as the adjacent portions of the sides 44a, 44b of the housing chamber 62, but is slightly smaller to allow the top of the housing to be crimped or rolled over to hold the bar (retainer, retraining member) in place. In the preferred embodiment, the retainer 70a is sewn to the neck side 34a along a seam shown by the dotted line 72. The type of seam or sew line used is a regular lock stitch. Conventional air bag thread (#138) may be used. The sew pattern includes a double line of stitching, 10 millimeters apart, to secure the bar and air bag. However, other stitch patterns can be employed such as a rectangular box stitch pattern. The double line of stitching can be curved to more evenly distribute the deployment loads along the length of the retainer. The plastic retaining members 70a and 70b are sewn to the outside of a respective cushion neck flap such as 34a and 34b. Each flap or side 34a or 34b is wrapped around the bottom of a respective retainer 70a or 70b as generally shown in FIG. 7. In essence the retainer is entrapped between the flap and the neck. This construction reduces the load on the stitches as the applied load is shifted to the bottom of the retainer to avoid placing a sheer force directly on the sew line. Similarly, the second retainer 70b is secured to the opposite neck side 34b in the same manner. FIG. 7a shows an alternate embodiment for attaching a retainer or retaining member to a side or flap of the air bag. As can be seen, the neck side (or flap) is not wrapped about the retaining member 70a (or 70b) and is secured using two rows of stitches 72. If the neck sides are welded to the retaining members, the weld line would replace the line of stitches 72. If the neck sides are riveted to the retaining members, a plurality of rivets 72b would be located at the sew line 72 (see FIG. 7b). Staples 72c are used in FIG. 7c to secure the air bag to the retainer (retaining member) 70a. The length of each neck side 34a,b and the length of each retainer 70a,b is chosen to extend from one end cap of the housing to the other. The width of each retaining member 70a,b is approximately equal to the width of an associated groove 50a,b.

Figure 11:
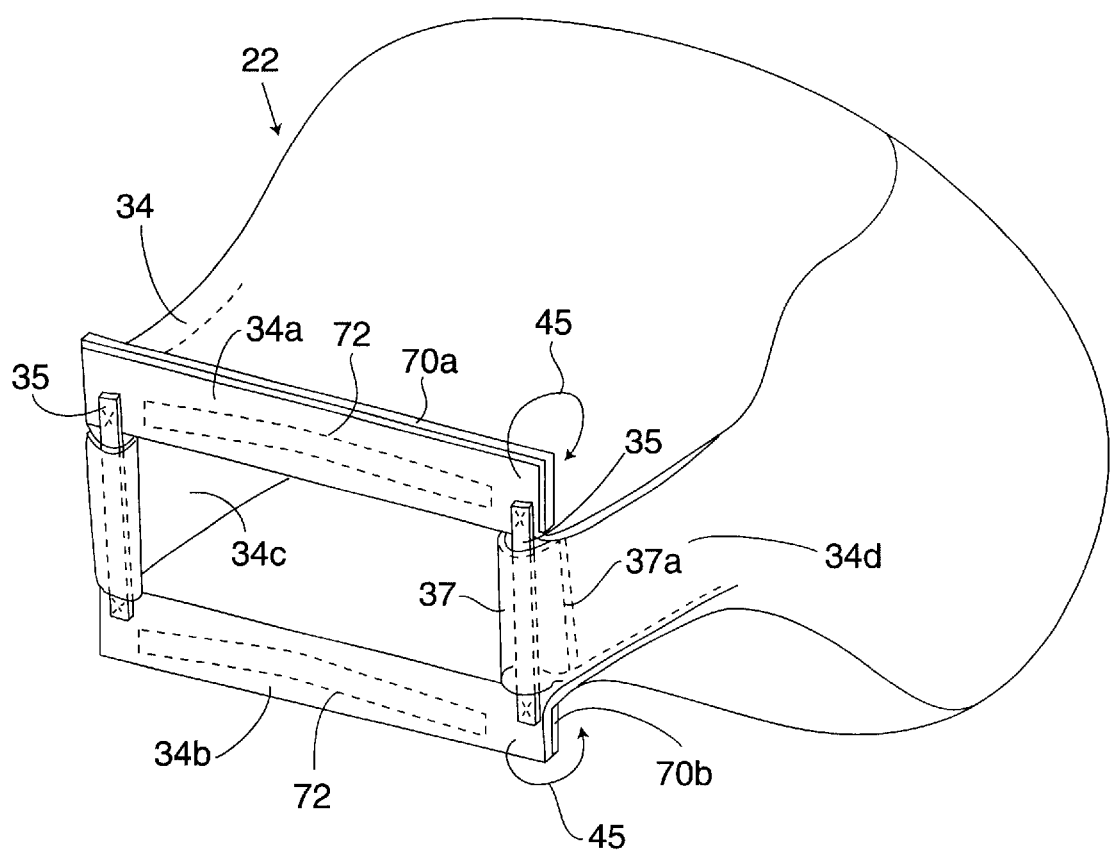
FIGS. 11 and 12 show a further alternate embodiment of the invention.

Reference is again made to FIG. 1. As can be seen, the air bag 22 includes a second set of neck sides 34c and 34d. This relationship is also shown in FIGS. 5 and 11, but here the flaps are linked together. As mentioned above, the neck sides 34a and 34b and restraining members 70a and 70b extend from end cap to end cap (see FIG. 4). This construction places the neck sides 34c and 34d adjacent the interior sides or side wall of a respective end or end cap of the housing. Also with this construction, it is not necessary to positively secure or reinforce these shorter neck sides to the housing, as they will not interfere with the flow of inflation gas from the inflator into the mouth 33 of the air bag. It is within the scope of the invention, however, that additional retainers can optionally be secured to each of the shorter sides (or flaps) 34c and 34d to more positively control the position of these neck sides relative to the ends (end caps 42a,b) of the housing 24, if desired. As an example, the end caps 42a and 42b can also be constructed with an associated groove similar to grooves 50a and 50b and the retaining members (associated with the narrow sides) secured to the end caps in the manner that retaining members 70a and 70b are secured to the center body or portion 40 of the housing.

Figure 12:
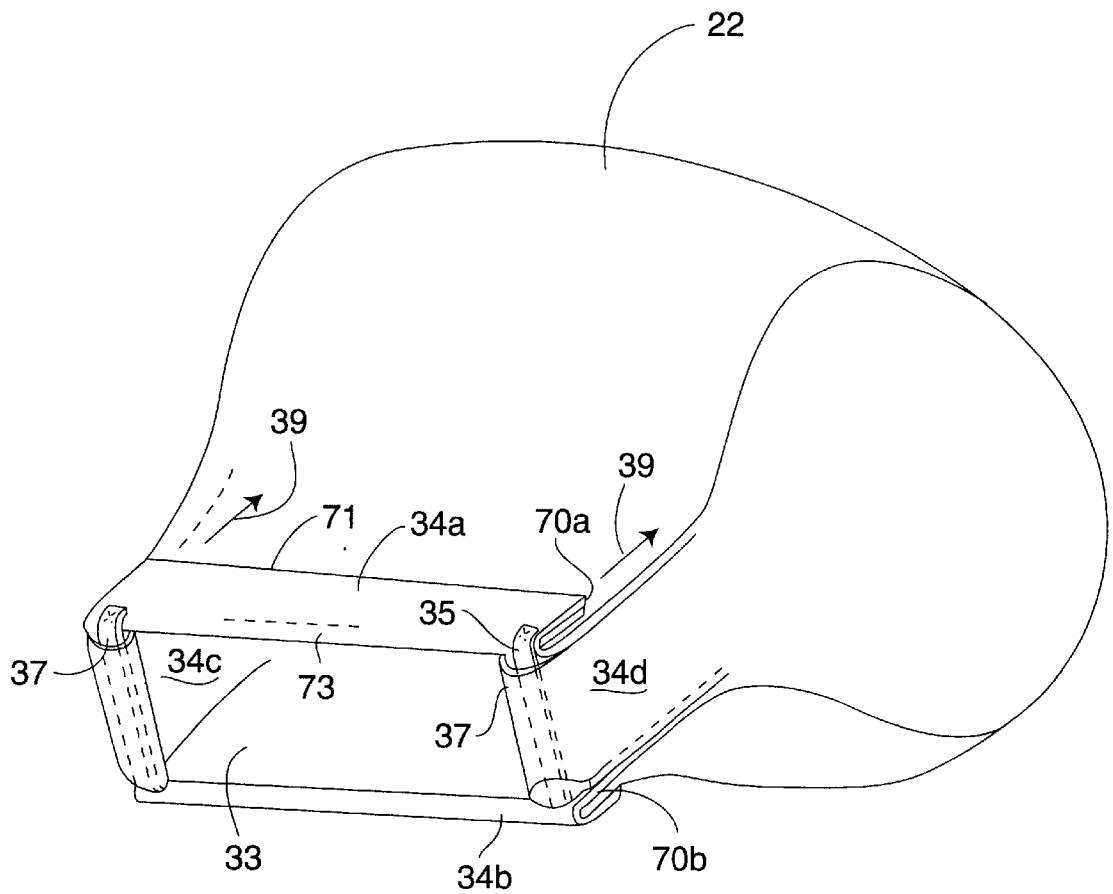

Reference is now made to FIGS. 11 and 12, which show a further embodiment of the invention. As illustrated in FIG. 11, the neck sides 34a and 34b are positioned generally perpendicular to the neck 34. Secured to each of these neck sides 34a and 34b is a respective retainer 70a and 70b. Each retainer is attached to a corresponding neck side using a closed, rectangular sewn seam line 72. Prior to attaching retainers to the neck sides, a first and second strip or strap of fabric or other material 35 is attached by sewing near the end of each of the neck sides 34a and 34b. As can be seen, these pieces of material form a support or bridge between the longer neck sides 34a and 34b. The shorter neck sides 34c and 34d are formed into respective loops 37, which envelop a respective fabric bridge strap 35. Each loop 37 is loosely received about a respective fabric bridge strap 35. The line of stitches 37a shows that ends of each side 34a and 34b are looped and sewn together. The neck sides 34a and 34b, with their corresponding retainers 70a and 70b, are then rotated inwardly, parallel to other portions of the neck as illustrated by arrow 45. The resulting configuration is shown in FIG. 12.

FIG. 12 shows the configuration of the neck sides 34a–34b enabling the air bag to be positioned within the mouth 25 of the housing 24. As can be appreciated, the air bag 22 of FIG. 12 can be positioned and folded within the housing as shown in FIGS. 8a–8d. Thereafter, the housing sides may be crimped about the top 71 of each respective retainer member while the bottom 73 of each retainer and rolled-over portion of the neck sides 34a and 34b are received within a respective groove 50a,b. Additionally, it can be seen that the lengths of each of the fabric bridge straps 35 is chosen such that with the air bag in this configuration, the spacing between sides 34a and b corresponds to the spacing between grooves 50a and 50b to allow easy insertion of the air bag 22 into the housing 24. As mentioned earlier, each of the loops 37 loosely envelops a corresponding fabric bridge strap. The go -purpose of this construction is as follows. As the air bag expands, the reaction forces will be absorbed by the neck sides 34a and 34b and the retainers 70a and 70b. By maintaining a degree of looseness in the construction of the sides 34c and d, the air bag material forming the ends of these sides will not be subjected to this loading.

Figure 27:
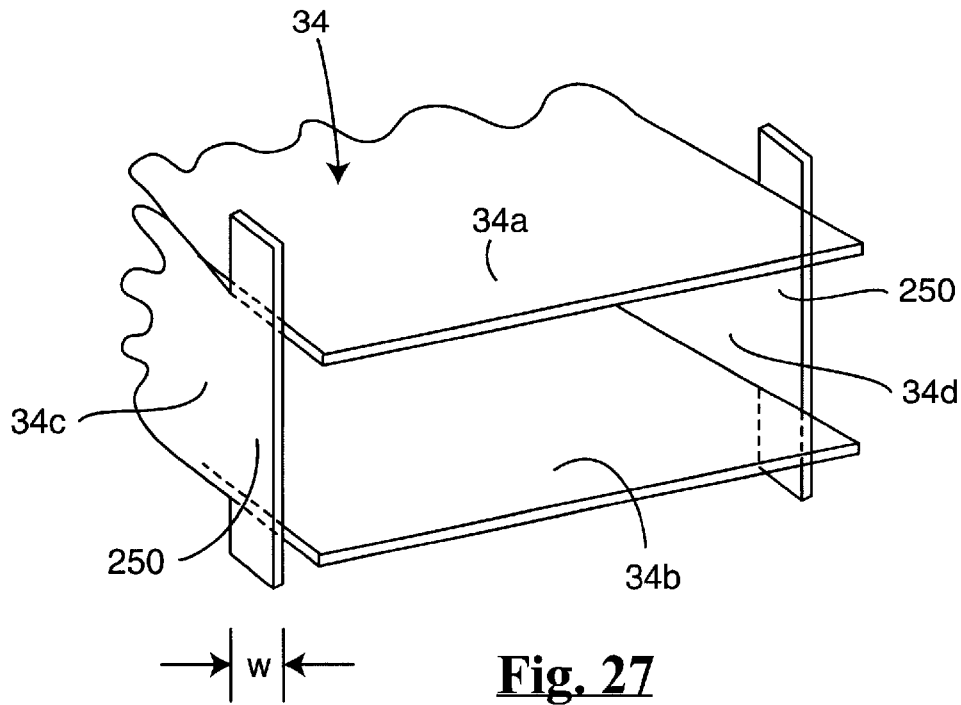
FIGS. 27–29 show a further embodiment.
Figure 28:
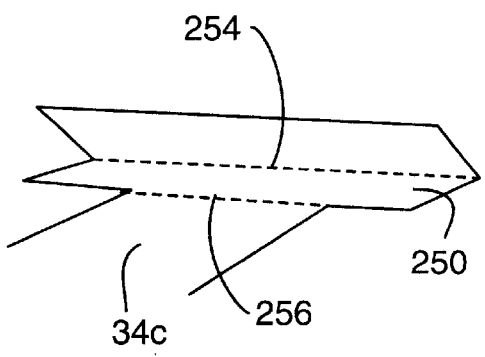
Figure 28A:
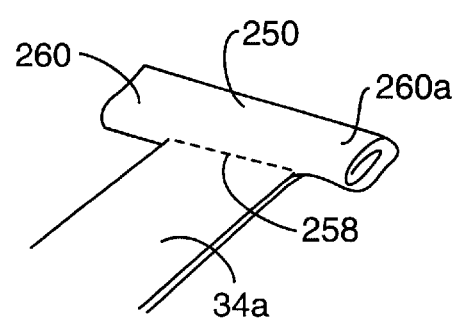
Figure 29:
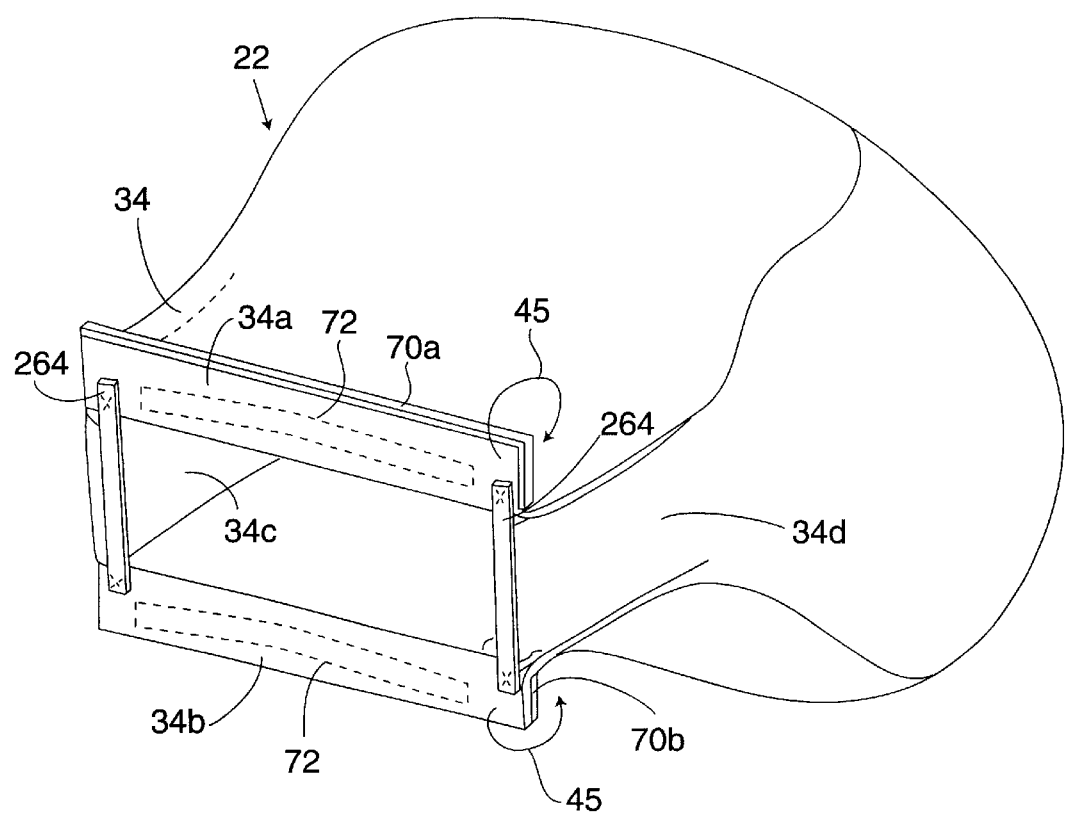

FIGS. 27–29 illustrate another preferred embodiment showing another way of attaching the shorter neck sides 34c and 34d to the longer neck sides. In this embodiment the ends of each of the neck sides 34c and 34f are generally T-shaped and include an extension 250 having a predetermined width, w. This extension or bridge 250 replaces the bridge straps 35. Each extension 250 is optionally folded over (see FIG. 28) a fold line 254 (preferably in half). Each extension is again folded over a second (or more) time about fold line 256 located at the base of each extension 250, see FIG. 28. The now folded-over extension 250 can be maintained in this configuration by a tack seam 258 to the narrower portion or leg of each respective neck side 34c and 24d (see FIG. 28a). Each of the ends 260 and 260a of each (folded-over) extension 250 is sewn at 264 to a respective, opposing end of the longer neck sides 34a and 34b as shown in FIG. 29. The configuration of FIG. 29 is very similar to that of FIG. 11. Thereafter the longer sides are secured to the retainers 70a and 70b, in the manner discussed above, and the air bag is similarly secured to the housing. As can be appreciated, the folding over of the extensions 250 creates a multilayered or reinforced end 260 and 260a. If the neck material is sufficiently strong the extension 250 can be directly secured to the longer sides without folding. Additionally, the initial width of the extension can be chosen to be the same as achieved when using a wider, folded-over extension. The length of the neck sides 34c and 34d is chosen to also provide a degree of looseness in the construction so that the shorter neck sides 34c and 34d are not directly stressed when the air bag inflates.

The configurations as described above lend themselves to two methods of assembling the air bag to the housing. In one method, the retainers (with neck sides attached) are first secured to the housing and the air bag is then folded and secured to the housing. In another method, the air bag is first folded into a desired shape and the air bag and retainers inserted into the housing as a subassembly and the retainers subsequently secured to the housing.

Figure 8A:
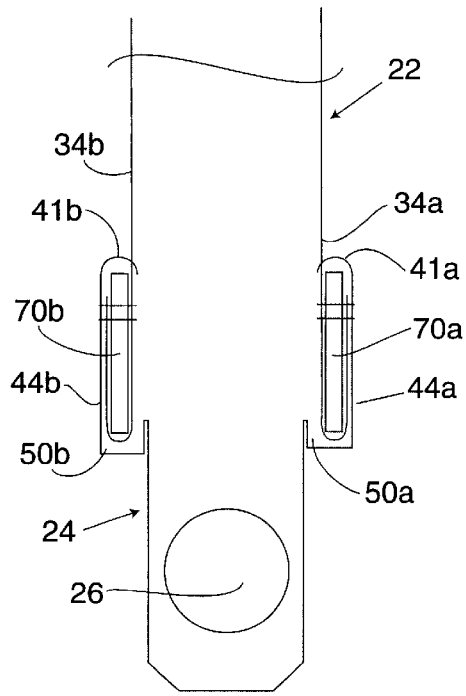
FIG. 8a shows the neck and retaining member placed within the housing.

Reference is made to FIG. 8a, which shows the center housing part 40 in cross section. The retainers 70a and 70b (with the neck sides attached thereto) have been placed within a respective groove 50a and 50b. As can be appreciated, the top portions 41a and 41b of sides 44a and 44b of the housing extend beyond the top of each respective retainer 70a and 70b. Subsequently, the top portions 41a and 41b of each side 44a,b are rolled or crimped inwardly over the top of a respective retainer 70a and 70b, thereby securing the retainers and air bag in place within the housing. As previously mentioned, since the retainers 70a and 70b, as well as the sides 34a and 34b, extend along the interior of the housing 24, this construction places the unsupported sides 34c and 34d of the air bag 22 proximate the inside surfaces 53a and 53b (see FIG. 4) of the end caps 42a and 42b respectively. This relationship also holds for the embodiment of FIG. 11 in which the unsupported, non-reinforced sides or flaps 34c and 34d are held relatively taut, and against surfaces 53a and 53b, by the entrapment of the "T" shaped extensions 250 by the retainers 70a and 70b.

Figure 8B:
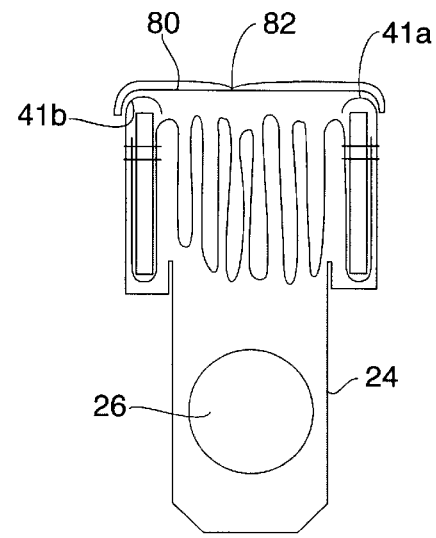
FIG. 8b shows a portion of the housing crimped about the retaining member.

In one method of assembly after the sides 44a and 44b have been crimped over the respective retainers 70a and b, the cushion 30 is folded and positioned within the air bag receiving chamber 62 of the housing 24 as illustrated in FIG. 8b. The cushion 30 can be retained within the housing by covering the top of the folded air bag 22 with a thin, tearable material liner (or covering) 80 having a tear seam 82. The edges of the sides of the liner 80 can be glued in place on the housing sides 44a and 44b or on the crimped-over tops of the sides. The liner 80 can be paper or a reinforced material such as Tyvek having a line of perforations 82, which define a seam line. A deployment cover 83 with a tear seam 85 can be secured to the housing 24 to protect the liner and air bag.

Figure 8C:
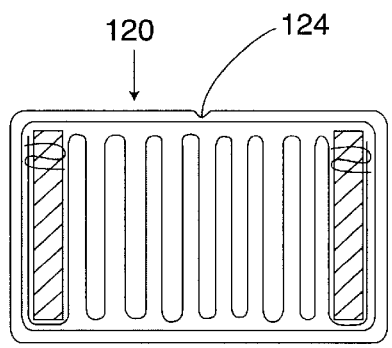
FIG. 8c shows an air bag subassembly.
Figure 8D:
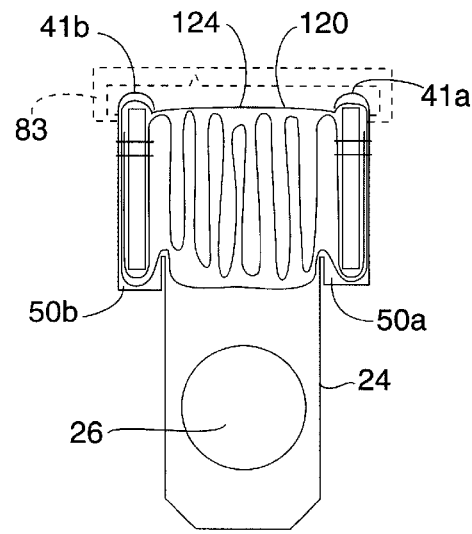
FIG. 8d shows another method of assembly.

In the other method of assembly, a cushion assembly 120 comprising the air bag 22 and the attached retaining members 70a,b is placed as a unit into the housing 24. More particularly, after the retainers 70a,b are attached to the neck sides, the air bag 22 is folded remote from the housing 24. The folded air bag and retaining members 70a,b are enveloped by a plastic shrink wrap material (or Tyvek-type of material) 122 which may also include a preferred tear line or seam 124 such as a line of perforations as shown in FIG. 8c. FIG. 8d shows the cushion assembly 120 positioned in the housing 24. Thereafter, the sides 41a and 41b are rolled over to complete the assembly operation. A deployment cover 83 can be attached to the housing 24 and is shown in FIG. 8d.

Figure 9:
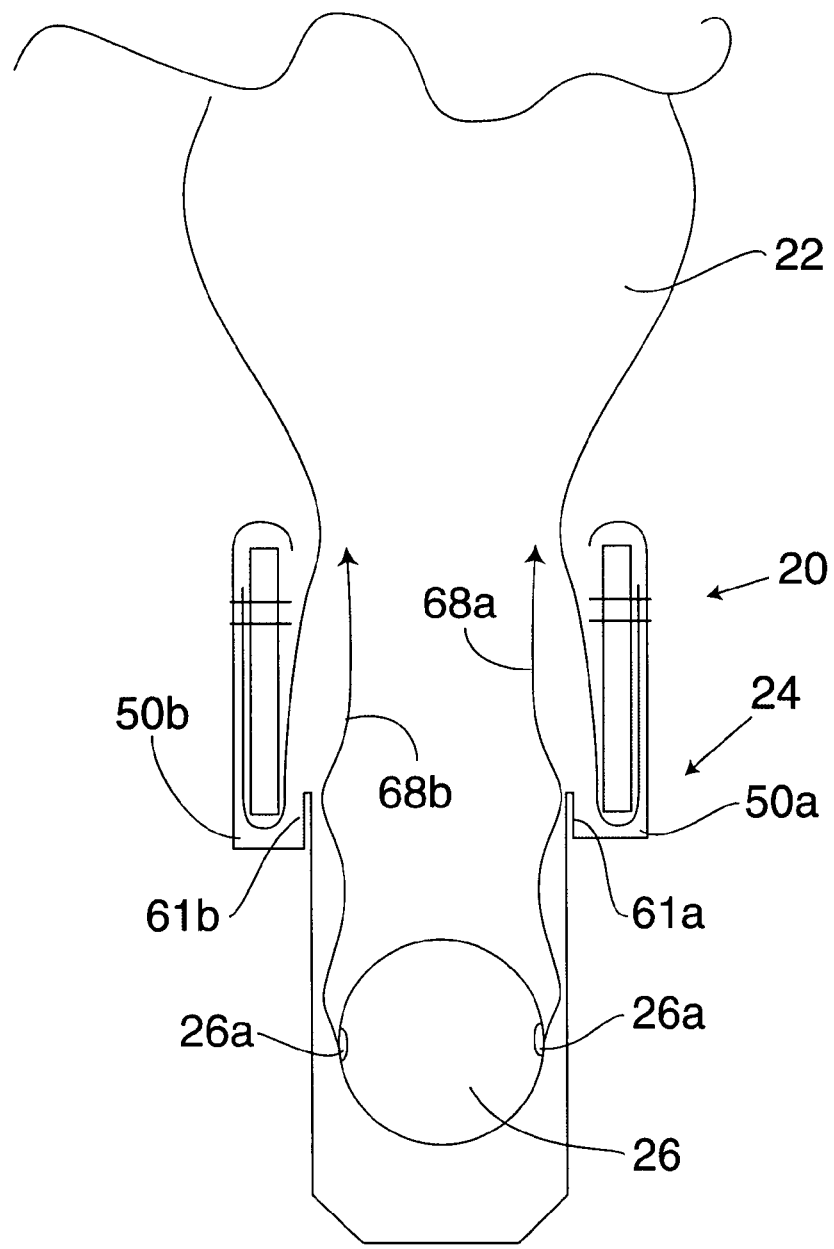
FIG. 9 is a cross-sectional view showing a partially inflated air bag.

FIG. 9 is a cross-sectional view of module 20 showing a partially inflated air bag 22. Additionally, arrows 68a and b represent the inflation gas emanating from exit ports 26a on the inflator 26. It has been found that the extending walls 61a and 61b that form the inside wall of the grooves 50a and b also serve as a deflector or heat shield to deflect the heated gas away from the neck area of the air bag.

Figure 10A:
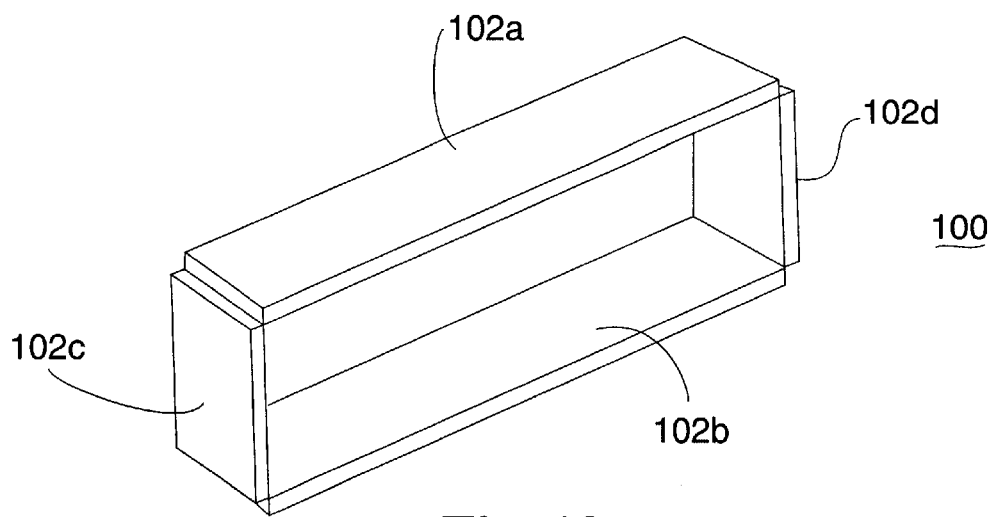
FIG. 10a is an isometric view of an alternate retaining member.
Figure 10B:
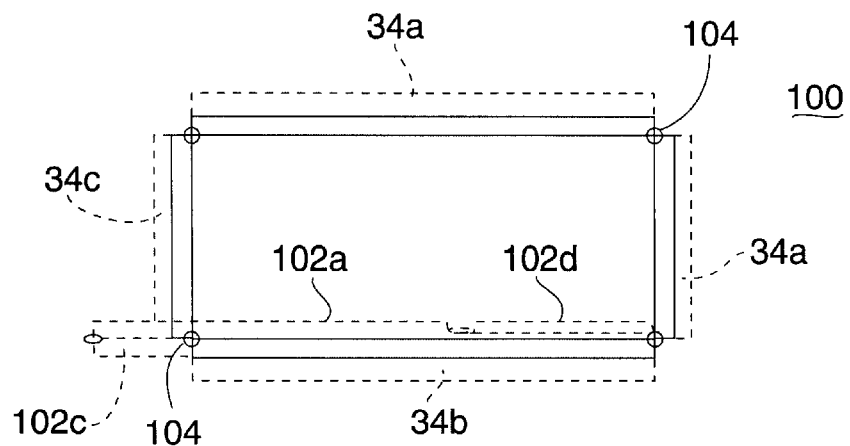
FIG. 10b is a front plan view of the alternate retaining member.
Figure 10C:
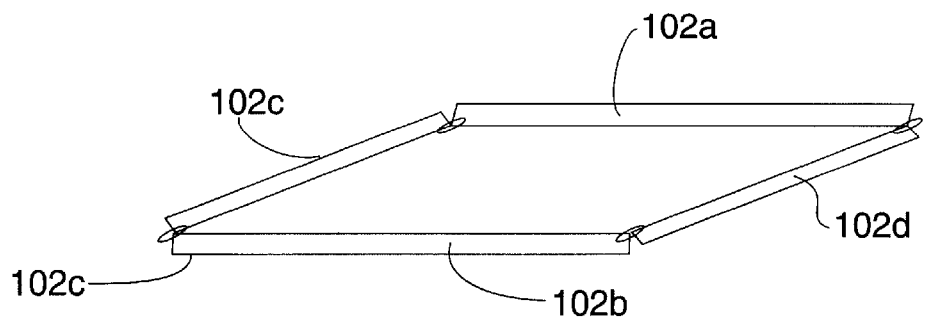
FIG. 10c shows an alternate retaining member partially bent over.

FIGS. 10a and 10b illustrate an alternate retainer member 100. This retainer member 100 is formed as a hollow, thinned wall structure having two sets of opposing sides 102a, 102b, 102c, and 102d. Each side is connected to an adjacent side via a flexible hinge 104 that permits the retainer member 100 to be folded and collapsed downwardly (see FIG. 10c). While a rectangularly shaped retainer is shown, it can be square or circular. The retainer member 100 is positioned about the neck 32 of the air bag with a respective one of the neck sides 34a–d aligned to a respective side 102a–102d of the retainer member. Thereafter, at least the longer neck sides 34a and 34b are joined (sewn, welded, riveted, stapled, etc.) to the retainer member. Sides 34c and 34d of the neck can also be joined to the shorter sides 102c and 102d of the retaining member 100 as well. The joining is facilitated by the hinges 102 as they permit the retainer to be collapsed as shown in FIG. 10c prior to and during joining. The assembly of the air bag 22 and retainer member 100 to the housing 24 is essentially the same as described above. The hollow retainer member 100, with the air bag prefolded or unfolded, is positioned within the housing such that the bottom of sides 102a and 102b is received within a respective groove 50a or 50b. Thereafter, the top of the sides of the housing is curled or crimped over to secure the retainer member and the air bag to the housing.

Reference is briefly made to FIGS. 13 through 15, which show a further embodiment of the invention. In this embodiment the neck sides 34a and 34b are each formed into a loop 130 and a respective retainer member such as 70a or 70b slipped therein. The looped sides 34a and 34b include a predetermined number of openings 132 arranged at the tip of the folded loop 130. The ends of each of the sides 34a and 34b, with a retainer member therein, are folded outwardly upon themselves. This rotation positions the openings 132 vertically. The rolled or folded-over ends of each neck side are positioned within a respective groove 56a or 56b as shown in FIG. 14. As can also be seen in FIG. 14, an adjacent length of side 34b is positioned toward the inside of chamber 62. The air bag can be folded using either of the techniques mentioned above. In this embodiment of the invention, the sides 44a and 44b of the housing include a plurality of tabs 140. The tabs 140 are preferably equal in number to the number of openings 132. With the neck sides located in the housing, each of the tabs 140 is bent over (see arrow 144). The tabs each fit within a respective opening and lock directly upon the retaining member avoiding pinching the neck material. FIG. 15 shows the air bag 22 within the housing with the tabs 140 holding each of the retaining members. As can be appreciated, the housings shown in the other figures can also include tabs 140 rather than requiring that the entire length of the tops of each housing side be crimped over to hold the retaining members. In a further embodiment, the openings 132 shown in FIG. 14 can be removed (not shown). In this case, the bent-over housing parts, such as the top of the side of the housing or the tabs 140, are crimped over the air bag material thereby holding the retaining member(s) in place.

Figure 16:
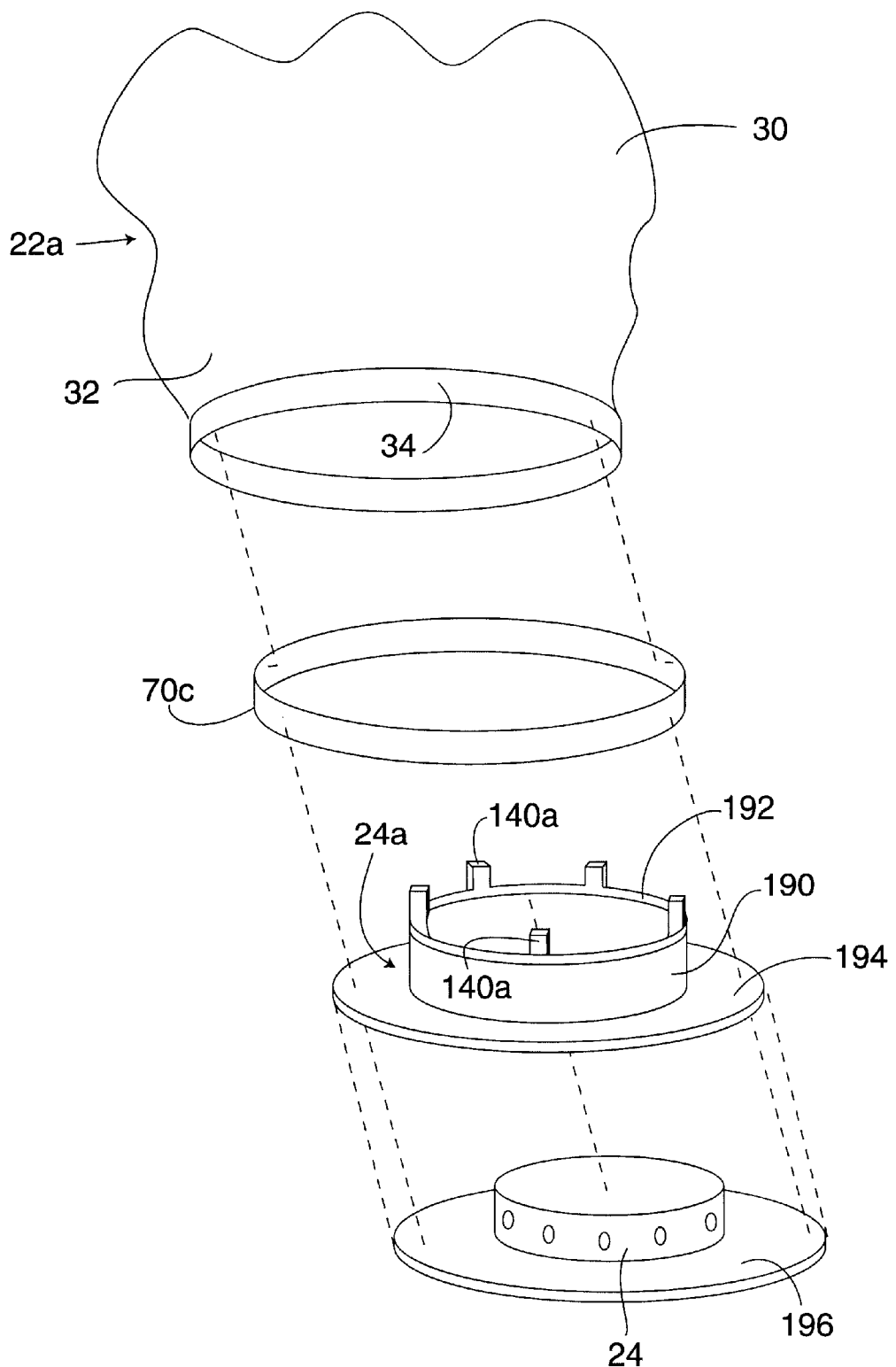
FIGS. 16 and 17 show still another alternate embodiment of the invention.
Figure 17:
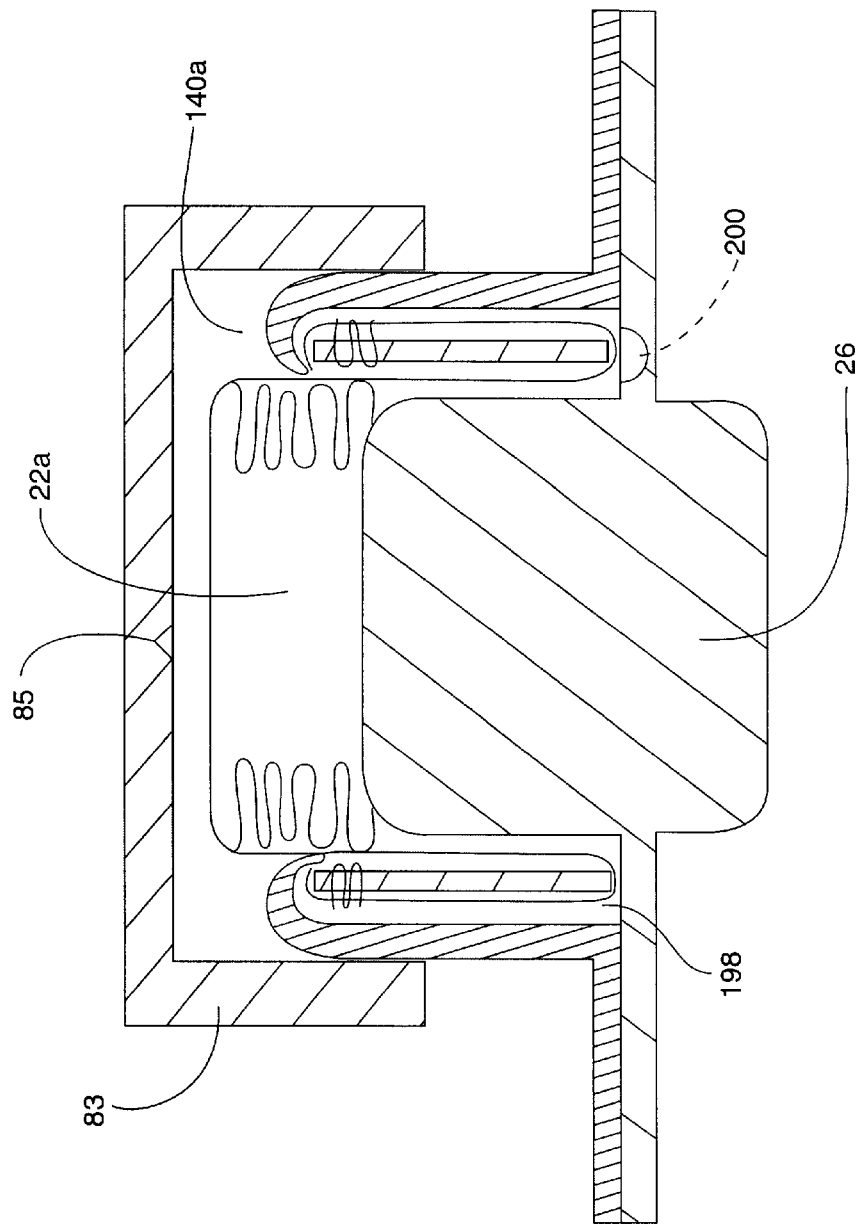

Reference is briefly made to FIGS. 16 and 17, which show an air bag 22 having a neck 32 formed into a continuous curved neck side 34e. This side is reinforced by a similarly shaped retainer 70c. The retainer 70c is secured to the neck side 34e using any of the techniques referred to above. The retainer 70c and neck side 34e are received within a housing 24a having a wall 190 shaped to conform to the shape of the retainer 70c. The top 192 of the wall is deformable, or alternatively, the top 192 may include a plurality of tabs 140a. The housing may include a flange 194. An inflator 24 is positioned within the housing. Associated with the inflator may be an additional flange 196. FIG. 17 is a cross-sectional view showing an assembled view of the various parts shown in FIG. 16. As illustrated, the retainer 70c has been fit between the spacing 198 between the inflator 26 and wall 190 whereupon the top 192, or alternatively, tabs 140a have been bent to secure the retainer 70c and air bag to the housing. Either prior to attaching the retainer to the housing or thereafter, the cushion portion 30 of the air bag is folded as illustrated. Subsequently, a deployment cover 83 having a tear line 85 is secured to the housing. As can be appreciated, the space 198 functions as the grooves 50a and b holding the retainer 70c in place. Alternatively, if desired, the flange 196 may be constructed with an annular depression (see numeral 200 shown in phantom line) to more closely replicate the grooves 50a and 50b.

Reference is briefly made to FIGS. 18 and 19, which illustrate a further alternative of the invention. In this embodiment, each of the grooves 50a and 50b includes a plurality of thin slots or openings 51 located in the bottom of each of these grooves. The retainers 70a and 70b include a like plurality of tabs 150 extending from the bottom 73 of each retainer. The retainers can, for example, be slipped within the loops 130 formed in the neck sides 34a and 34b. With the tabs 150 extending through a corresponding opening 132 in the folded over neck side, the retainer and the neck side are positioned within the housing. More particularly, each tab 150 is received within a corresponding one of the slots 51 in each of the grooves 50a and 50b. If the tabs 150 are flexible, they can optionally be folded over as shown in FIG. 19, thereby retaining or securing the retainers 70a and 70b and the folded-over neck sides to the housing 24. In the preferred embodiment, however, the tabs simply extend through a corresponding slot 51 (see FIG. 19a) and are not bent over. The tops 41a and b of each of the housing sides can be folded over the corresponding top 71 of each retainer to further secure the retainers and air bag in the housing. It should be appreciated that the retainers, with the tabs 150, can be substituted for the retainers shown in FIGS. 7a–7c. In these configurations, the neck sides 34a and 34b would not be formed into the loop 130. Reference is again briefly made to FIG. 19a. The grooves 50a and 50b in the above embodiments of the invention position the retainers 70a and 70b to the housing. As can be seen, this positioning is also accomplished by the cooperation of the slots and tabs. FIG. 19a also shows that the housing need not be fabricated with the upwardly extending inner walls 61a and 61, which have been eliminated in the embodiment.

Figure 20:
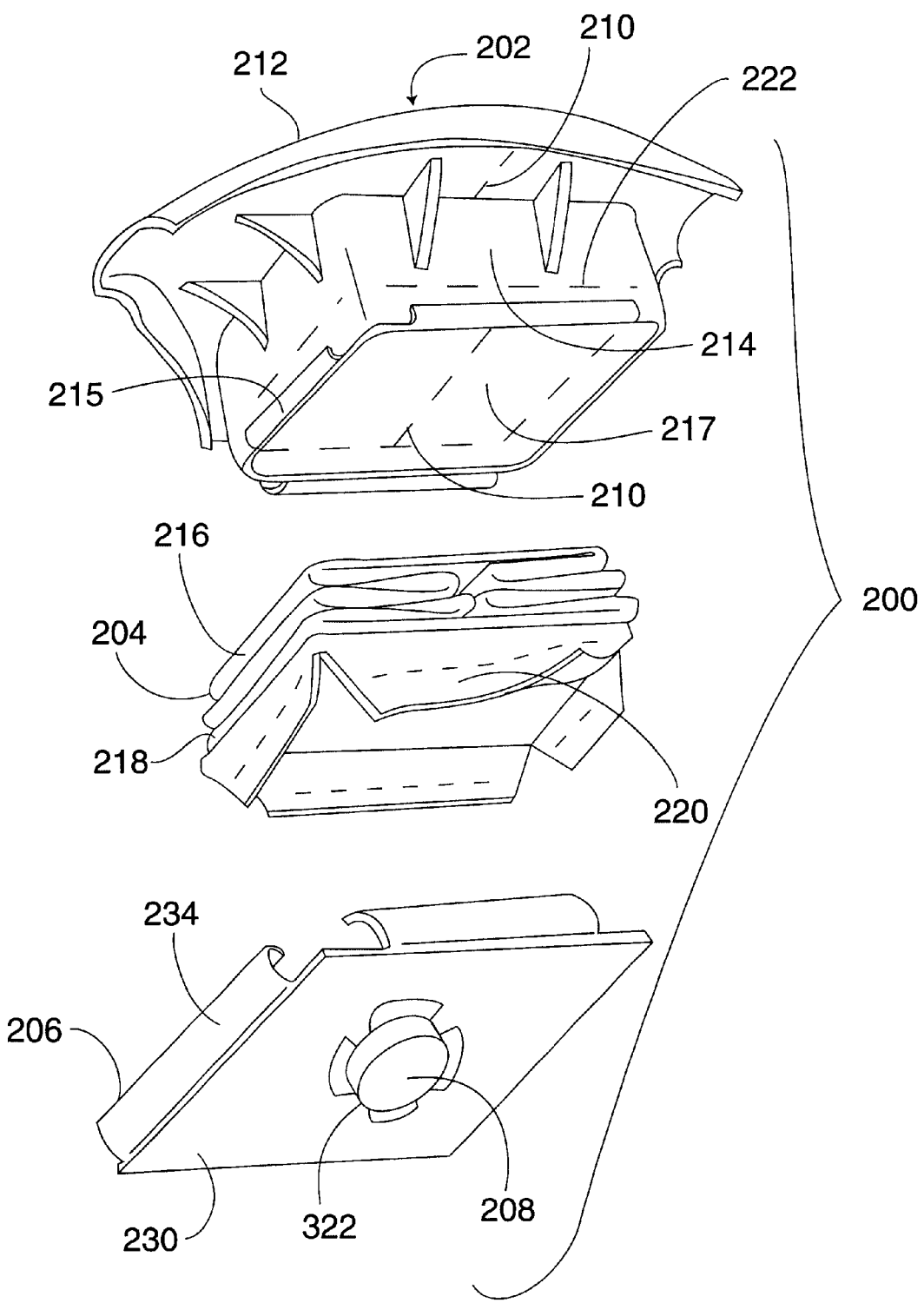
FIG. 20 shows an added embodiment of the present invention.
Figure 21:
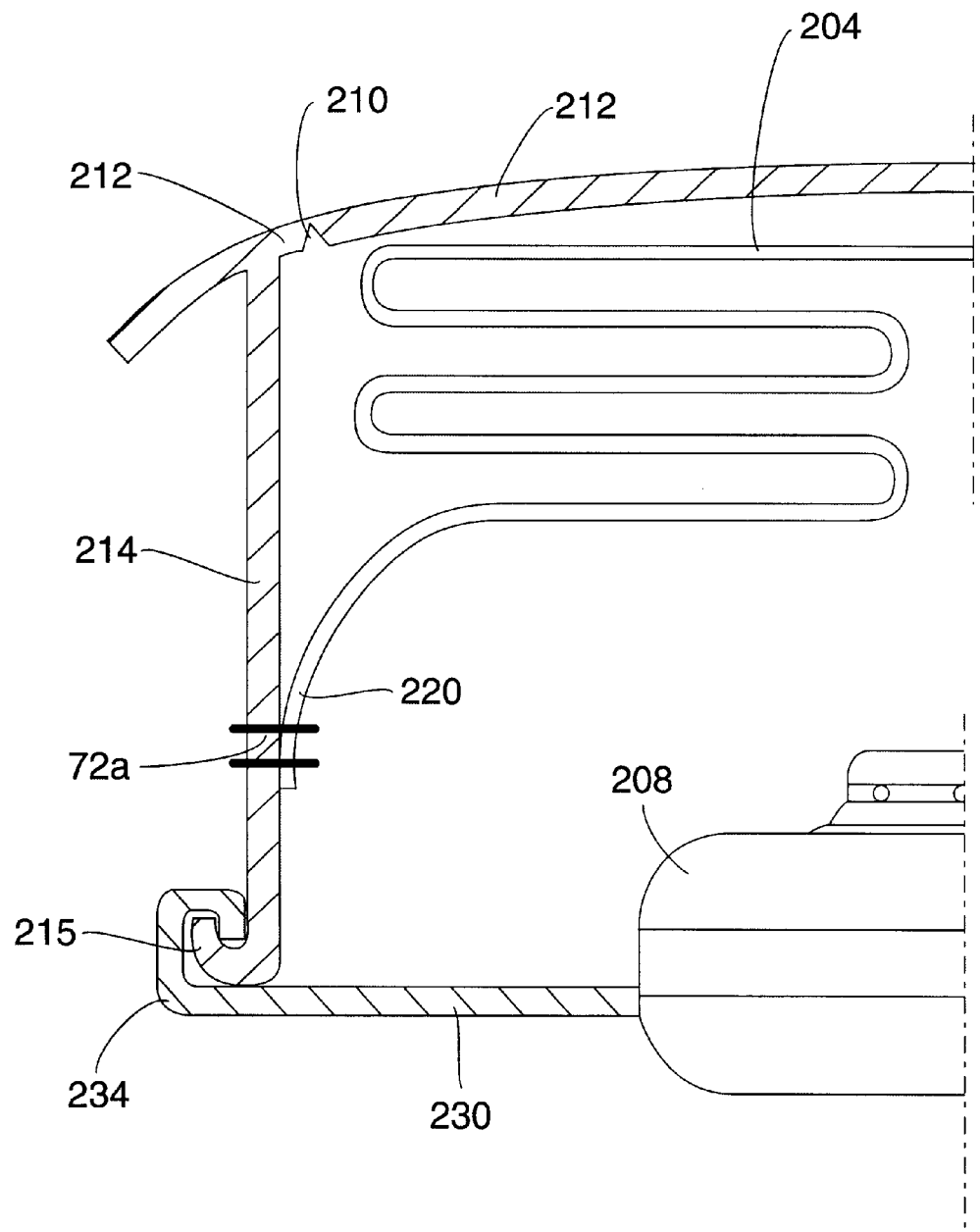
FIG. 21 is a cross-sectional view showing a portion of a driver side air bag module.

Reference is briefly made to FIGS. 20 and 21, which show still a further embodiment of the invention. Here the invention is applied to a driver side air bag module 200 comprising a cover 202, air bag 204, housing 206 and inflator 208. As is known in the art, most driver side air bag covers are plastic and are formed using some type of injection molding process. The cover 202 includes a tear seam 210 in a top surface thereof, enabling the top surface 210 to separate upon deployment of the air bag 204. The cover 202 illustrated in FIG. 20 has a plurality of depending sides 214 that form an opening 217. The tear seam 210 is located on the top of this opening on the underside of the top 212. The air bag includes an inflatable cushion 216 and a neck 218 with four depending sides 220. Each side 214 of the cover includes a connecting portion to enable the cover to be secured to the housing. The connecting portion may include an outwardly extending lip 215. Each lip 215 may be solid or shaped as a curved hook. FIG. 21 is a cross-sectional view showing a portion of the module 200 and more particularly the attachment of the air bag to the housing sides is more clearly shown. As can be appreciated from the above, each of the depending sides 214 act as a retainer, similar in function to the retainers 70a and 70b. The air bag is folded and the cushion 216 inserted into the cover 202. Thereafter, at least two opposing sides of the neck 220 of the air bag 204 are secured to corresponding sides 214 of the cover using any of the previously mentioned techniques. As can be appreciated, all four sides of the neck can be secured to a corresponding side of the cover. As shown in FIG. 21, the air bag is secured to the cover by sewing. The housing 206 includes a plate 230 formed with an opening 322 therein to receive and hold an inflator 208. The plate includes a plurality of holding features, such a hook-like feature, into which each respective connecting portion or lip 215 snaps upon.

Figure 22:
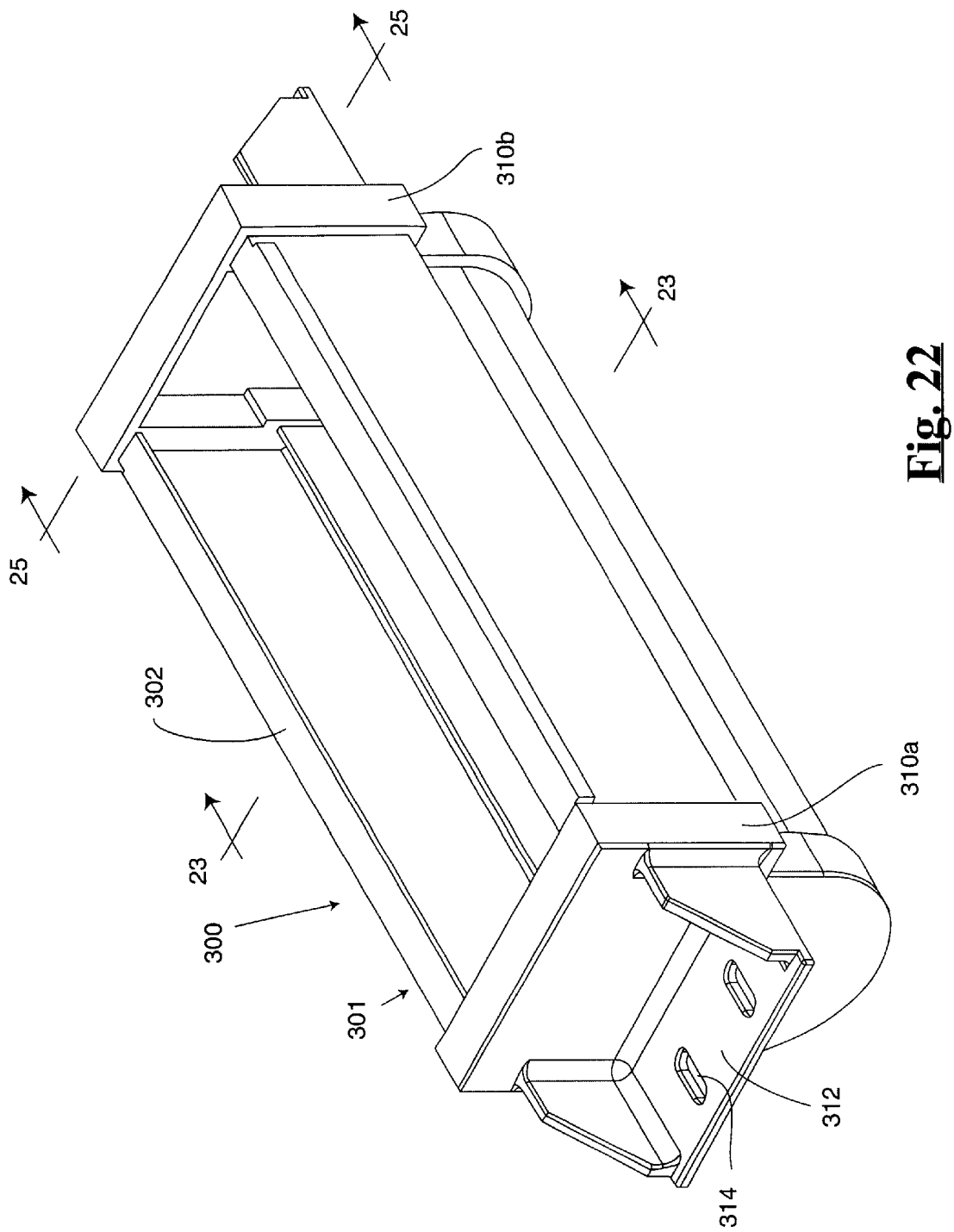
FIGS. 22–26 show another embodiment of the invention.
Figure 23:
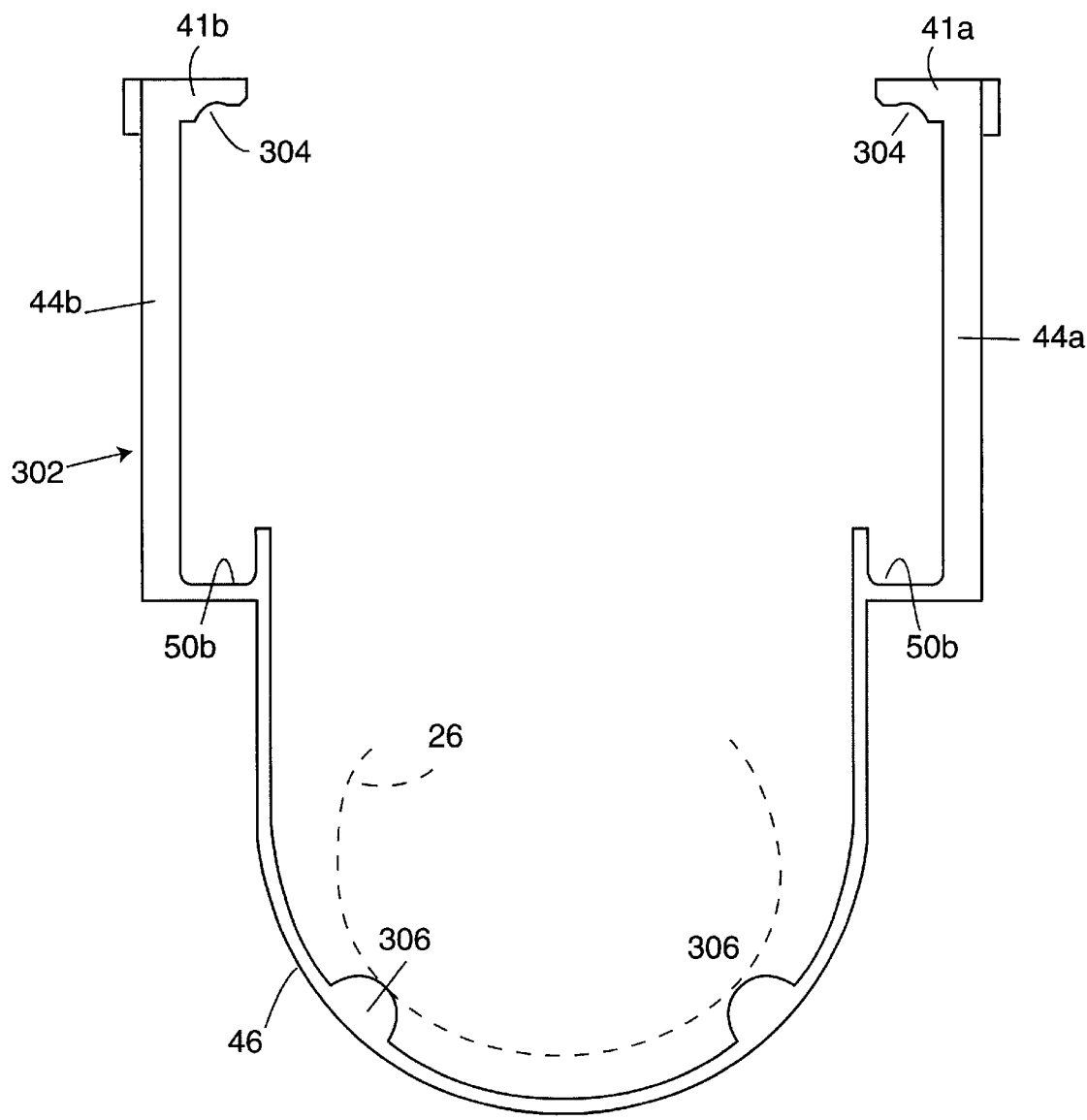
Figure 24:
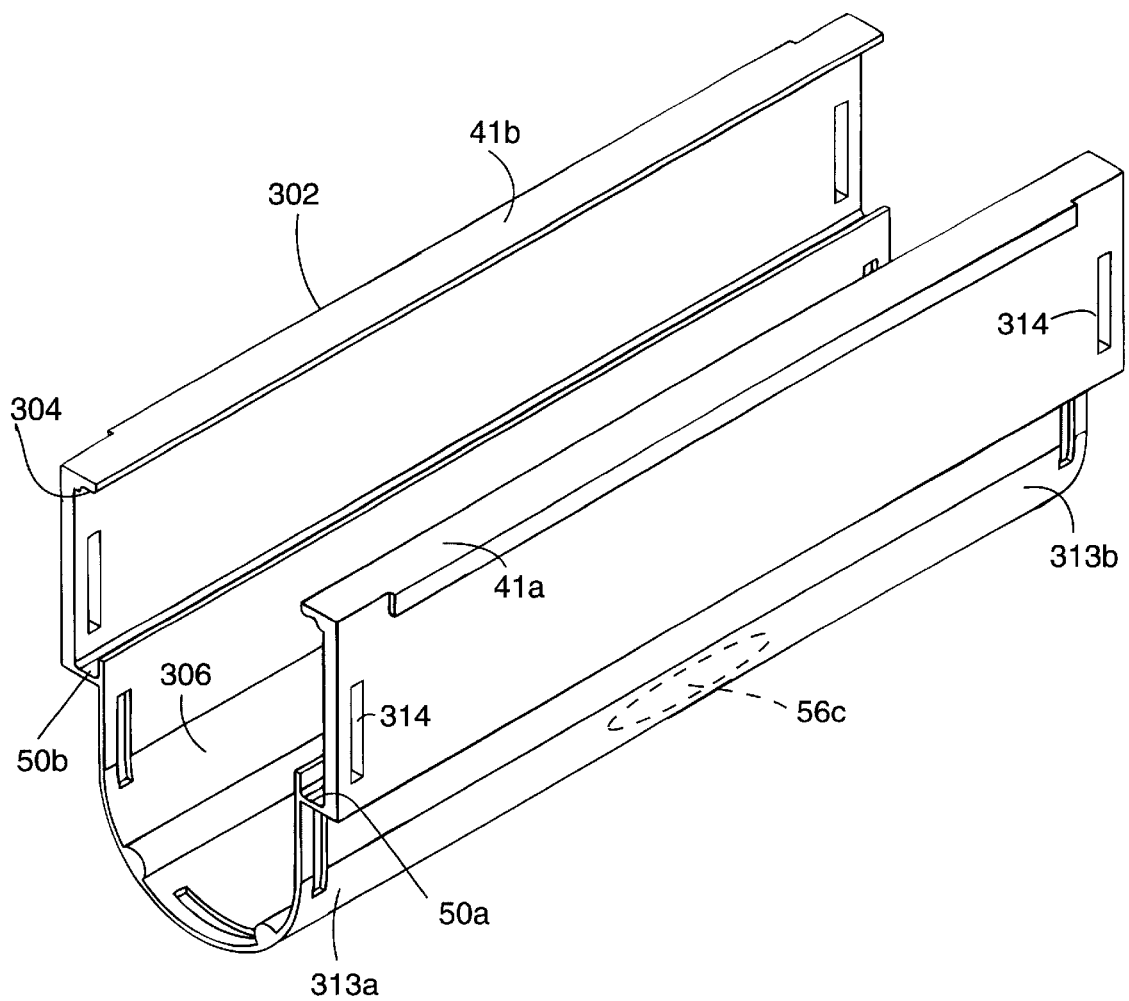

As mentioned earlier, the housing 24 can be formed with extruded parts. Reference is made to FIG. 22 which shows a further air bag module 300 comprising a housing 301 with a central body 302 formed of extruded material such as aluminum or plastic. FIG. 23 is a cross-sectional view through section line 23—23 of FIG. 1. As can be seen, the extruded housing includes grooves 50a and 50b and sides 44a and 44b. The tops 41a and 41b of each of the sides extend inwardly and on a bottom surface include a snap-in feature such as groove 304 which is located above each of the corresponding grooves 50a and 50b. After a retainer such as 70a or 70b is placed within a groove 50a,b, the top 71 of the retainer is moved outwardly into the groove 304 and snapped into and retained by a respective grooved top 41a or 41b. The bottom 46 of the housing part 302 includes a plurality of stand-offs 306, similar in function to stand-offs 57 (of FIGS. 1 and 2b) which extend axially through the extruded housing part. These stand-offs space the inflator 26, shown in phantom line, from the bottom 46 of the housing part 302. The housing 301, shown in FIG. 22, includes a plurality of end caps 310a and 310b. Each of the end caps includes a mounting flange 312 with one or more mounting openings 314 to facilitate mounting of the housing and module to a cooperating mounting structure within the vehicle. Reference is briefly made to FIG. 24, which shows an isolated view of the central housing part 302. As can be seen, the ends 312a and 312b of the housing include a plurality of slots 314, which are machined after the housing part 302 is extruded. The central housing part 302 may also include an opening such as 56c through which electrical wires may be passed. The housing part 302 may also include additional slots to accommodate clamps for straps to hold the inflator within the housing.

Figure 25:
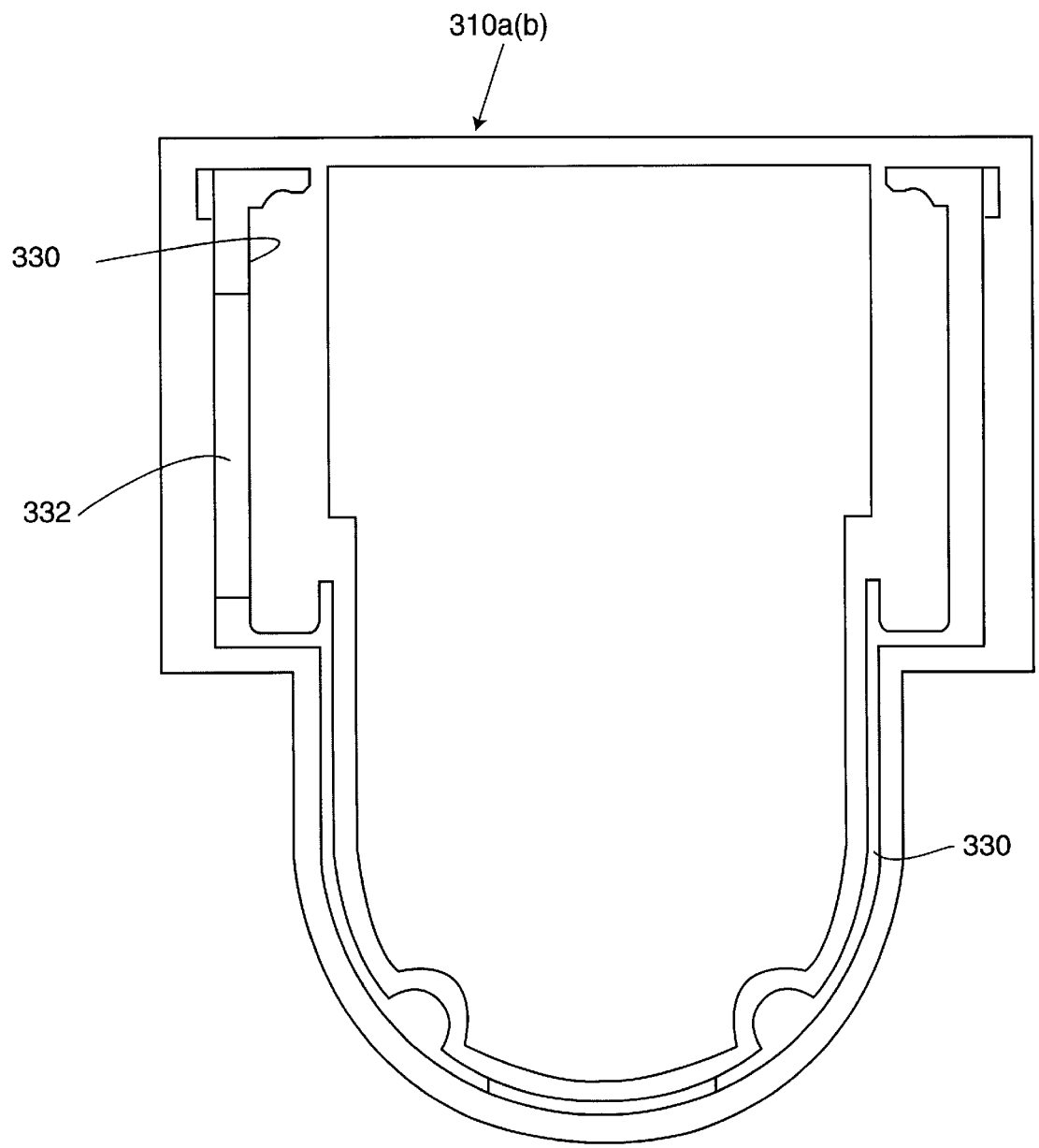
Figure 26:
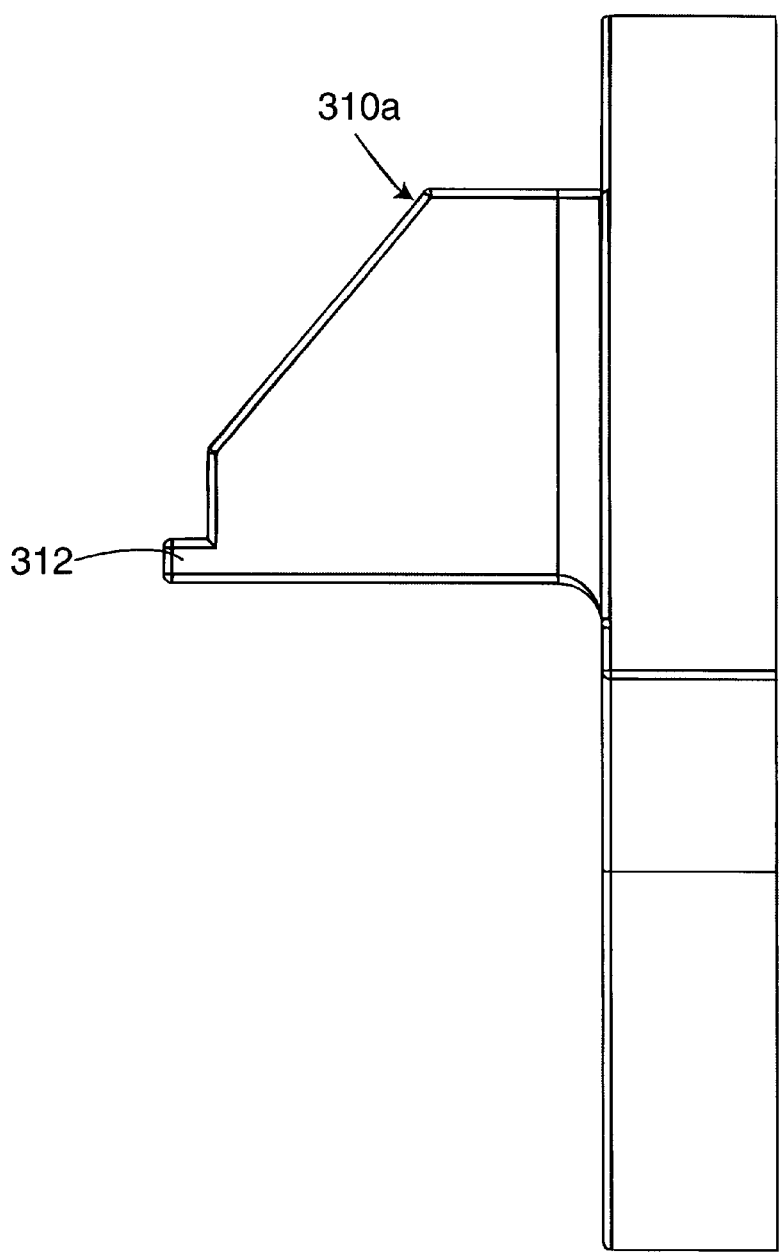

In this preferred embodiment of the invention, after the center body part 302 is formed in the manner as shown in FIG. 24, the end caps are preferably molded in-situ directly to respective ends 313a and 312b of housing part 302. As shown in FIG. 25, which is a cross-sectional view through section lines 25–25 of FIG. 22, each end cap is formed with an integral groove or grooves 330, which are formed during the molding process. These grooves 330 will be of identical shape to the features of the mating ends of the central body part 302. FIG. 25 also illustrates the purpose of the slots 314. With the end caps 310a and 310b molded in-situ, part of the molded end cap material 332, for example, fills each of the openings 314 formed in the center housing part 302 holding the end cap to the part 302. A deployment cover can be secured to the housing 301 if desired. The end caps 310a,b are also shown in side view in FIG. 26.

Figure 30:
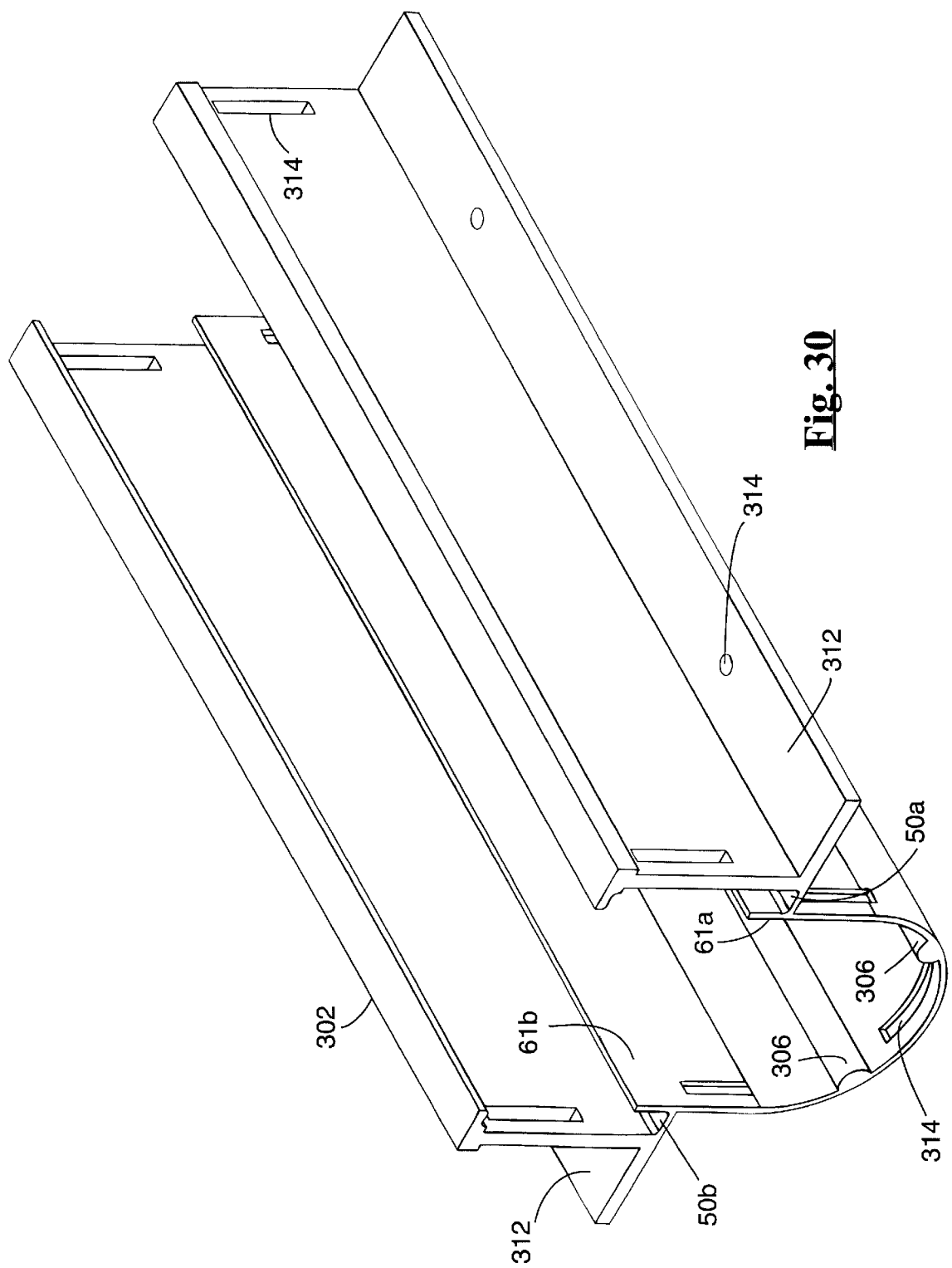
FIGS. 30–32 show an additional embodiment of the invention.
Figure 31:
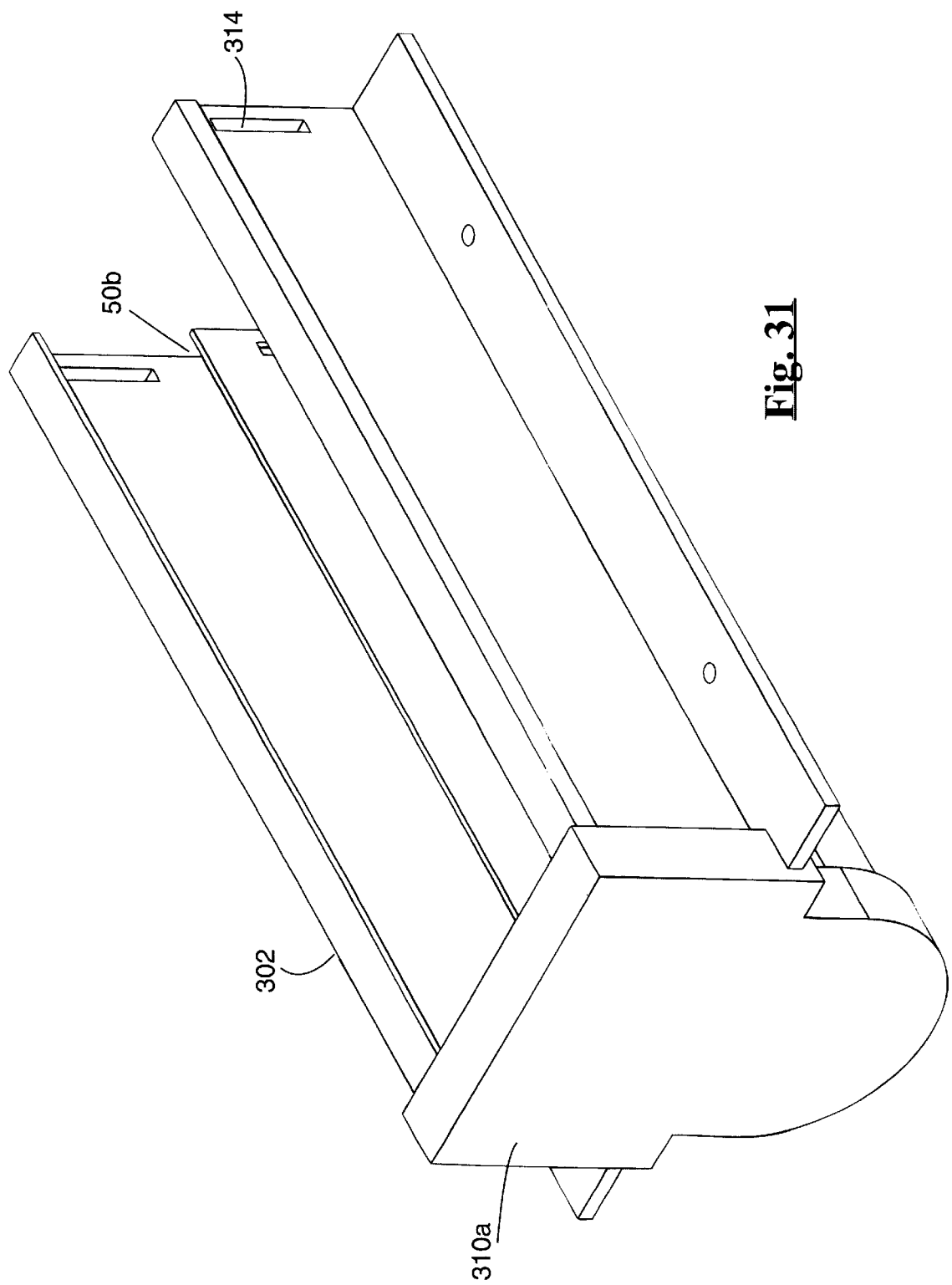
Figure 32:
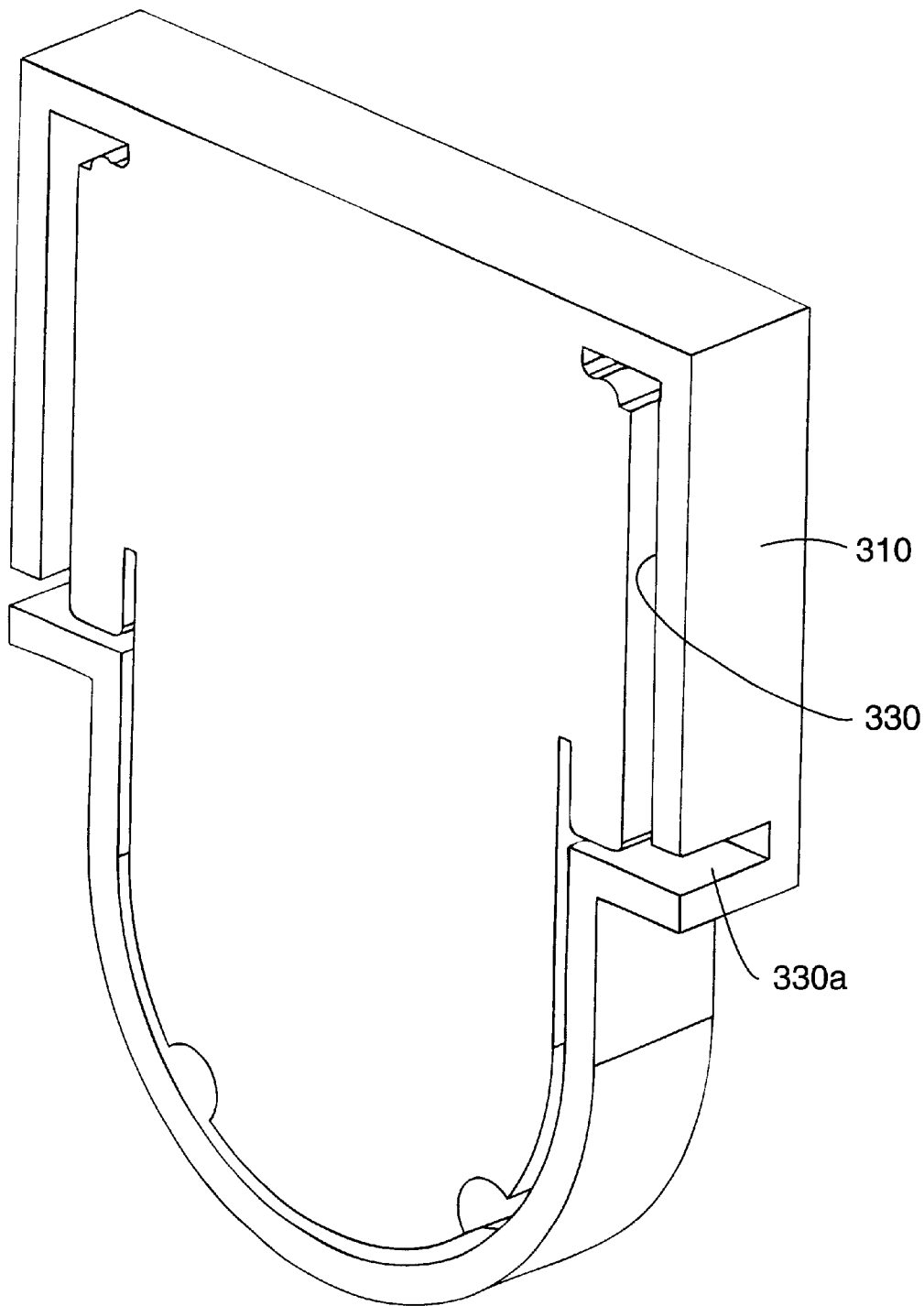

Reference is briefly made to FIGS. 30—32, which show a further embodiment of the invention. The center housing part 302 illustrated in FIG. 30 resembles that shown in FIG. 24. The center body part 302 additionally includes mounting flanges 312, which in FIGS. 22 and 26 were incorporated in the end caps 310a and 310b. These mounting flanges include mounting holes such as 314. With the mounting flanges 312 removed from the end caps, the end cap such as 310a illustrated in FIG. 31 has a generally flat exterior side. The end caps used in this embodiment of the invention are preferably molded in-situ about the center part 302. The end cap 310b is not illustrated in FIG. 31, but is illustrated in FIG. 32. As mentioned earlier, the various grooves 330 are formed when the end cap is molded to the housing part 302. Each of the end caps 110a and 110b additionally includes lateral grooves 330a which are molded about the lower portion of each respective groove 50a and 50b, as well as the respective end portion of each extending flange 312.

Many changes and modifications in the above described embodiment of the invention can, of course, be carried out without departing from the scope thereof. Accordingly, that scope is intended to be limited only by the scope of the appended claims.

What is claimed is:

1. An air bag assembly (20) comprising:
   an air bag (22) including an inflatable cushion portion (30) and a neck portion (32) in communication therewith, the neck portion defining a receiving opening (33) to receive inflation gas to inflate the cushion portion (30); the air bag being made from flexible material;
   retainer means (70a,b; 100) secured to at least a part of the neck portion for reducing the flexibility of the neck portion;

a housing (24) including receiving means (50*a,b*) for receiving and holding the retainer means in a preferred orientation and position within the housing;

wherein the receiving means includes a groove (50*a,b*) formed in the housing (24) for receiving a first edge of the retainer means and further includes a holding member (41*a,b*) formed by part of a wall of the housing (24).

2. The assembly as defined in claim 1 wherein the holding member includes a portion of the housing that is bent or crimped over to hold a second edge of the retainer means.

3. The assembly as defined in claim 1 wherein in the holding member includes an extending tab into which a second edge of the retainer means snaps.

4. The assembly as defined in claim 1 wherein the housing (24) includes a first (40*a*) and a second (40*b*) side, each side including a respective, integrally formed groove.

5. The module as defined in claim 4 wherein the housing includes an inflator-receiving chamber (60) and an air bag-receiving chamber (62).

6. The module as defined in claim 5, wherein the air bag subsequent to being attached to the housing is placed within the air bag receiving compartment.

7. An air bag assembly (20) comprising:

an air bag (22) including an inflatable cushion portion (30) and a neck portion (32) in communication therewith, the neck portion defining a receiving opening (33) to receive inflation gas to inflate the cushion portion (30); the air bag being made from flexible material;

retainer means (70*a,b*; 100) secured to at least a part of the neck portion for reducing the flexibility of the neck portion;

a housing (24) including receiving means (50*a,b*) for receiving and holding the retainer means in a preferred orientation and position within the housing;

wherein the air bag when in a groove is positioned farther away from the housing side than the retainer means.

8. An air bag assembly (20) comprising:

an air bag (22), a housing (24) and a cover (202);

the air bag (22) including an inflatable cushion portion (30) and a neck portion (32) in communication therewith, the neck portion defining a receiving opening (33) to receive inflation gas to inflate the cushion portion (30);

the cover including at least one depending wall and a first mounting feature engageable with the housing to enable the cover to be mounted to the housing; and at least a part of the neck portion is secured to the at least one depending wall;

wherein the depending wall, in part, defines a cavity into which the cushion portion is stored prior to deployment.

* * * * *